(12) United States Patent
Song et al.

(10) Patent No.: US 10,974,752 B2
(45) Date of Patent: Apr. 13, 2021

(54) FOLDING HANDCART

(71) Applicants: Jae Ho Song, Yongin-si (KR); Won Seok Song, Yongin-si (KR); Bo Kyoung Song, Suwon-si (KR)

(72) Inventors: Jae Ho Song, Yongin-si (KR); Won Seok Song, Yongin-si (KR); Bo Kyoung Song, Suwon-si (KR)

( * ) Notice: Subject to any disclaimer, the term of this patent is extended or adjusted under 35 U.S.C. 154(b) by 0 days.

(21) Appl. No.: 16/268,904

(22) Filed: Feb. 6, 2019

(65) Prior Publication Data

US 2020/0207393 A1 Jul. 2, 2020

(30) Foreign Application Priority Data

Dec. 27, 2018 (KR) .......................... 10-2018-0170518

(51) Int. Cl.
*B62B 3/02* (2006.01)
*B62B 5/06* (2006.01)

(52) U.S. Cl.
CPC .............. *B62B 3/022* (2013.01); *B62B 5/067* (2013.01); *B62B 2205/12* (2013.01); *B62B 2205/30* (2013.01); *B62B 2301/04* (2013.01)

(58) Field of Classification Search
CPC ..... B62B 3/022; B62B 5/067; B62B 2205/30; B62B 2301/04
See application file for complete search history.

(56) References Cited

U.S. PATENT DOCUMENTS

| 3,092,395 | A | * | 6/1963 | Mitty | B62B 1/12 |
| | | | | | 280/652 |
| 3,135,527 | A | * | 6/1964 | Knapp | B62B 1/12 |
| | | | | | 280/654 |
| 7,097,183 | B1 | * | 8/2006 | Su | B62B 1/12 |
| | | | | | 280/40 |
| 10,040,466 | B1 | * | 8/2018 | Su | B62B 5/064 |
| 10,376,030 | B1 | * | 8/2019 | Koh | A45C 13/26 |
| 10,668,938 | B1 | * | 6/2020 | Song | B62B 1/12 |
| 2003/0034636 | A1 | * | 2/2003 | Ng | A45C 5/14 |
| | | | | | 280/652 |
| 2005/0006877 | A1 | * | 1/2005 | Kachkovsky | B62B 3/027 |
| | | | | | 280/641 |
| 2014/0151172 | A1 | * | 6/2014 | Diaz | A45C 13/22 |
| | | | | | 190/1 |

(Continued)

FOREIGN PATENT DOCUMENTS

KR 19990033105 U 8/1999
KR 1020010110844 A1 12/2001

(Continued)

*Primary Examiner* — Brian L Swenson
(74) *Attorney, Agent, or Firm* — Egbert, McDaniel & Swartz, PLLC

(57) ABSTRACT

A folding handcart includes: a main body provided with a supporter configured to extend vertically from a lower portion thereof; and a loading plate provided with at least one loading plate wheel unit, connected to the supporter of the main body through a hinge unit, folded while being rotated toward the main body by the hinge unit, and stowing an article or a folding box, wherein, when the loading plate is folded while being rotated toward the main body, a predetermined stowing space is provided between the main body and the loading plate in accordance with an area of the supporter such that the folding box is folded and stowed therein.

10 Claims, 24 Drawing Sheets

(56) References Cited

U.S. PATENT DOCUMENTS

2016/0207555 A1\* 7/2016 Gibson .................. B62B 1/002
2017/0106889 A1\* 4/2017 Powwarynn ............ B62B 1/002

FOREIGN PATENT DOCUMENTS

| KR | 1020090109526 A1 | 10/2009 |
| KR | 1020170034710 A1 | 3/2017 |
| KR | 20170105732 A | 9/2017 |

\* cited by examiner

FOLDING HANDCART

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a folding handcart.

2. Description of Related Art Including Information Disclosed Under 37 CFR 1.97 and 37 CFR 1.98.

In general, a handcart is a carrying device that enables moving an article, a box, or the like by use of a wheel.

Especially, among various kinds of handcarts, a two-wheeled handcart includes: a main body vertically disposed with respect to the ground and having a handle at an upper end thereof; and a loading plate protruding from a lower portion of the main body vertically to load an article, or the like, wherein each of opposite sides of a lower portion of the main body is provided with a wheel part.

In the case of the conventional two-wheeled handcart constructed as described above, after an article or box is placed on the loading plate, a handcart handle is pulled backward to incline the upper end of the main body rearward such that the center of gravity of the main body and the article or box is positioned over the wheel parts. Then, a user pulls the cart using the handle to move the article or box stowed on the loading plate to a desired place by rotation of wheels. In addition, the cart is configured such that, when the cart is not used for loading of an article or box, the loading plate is folded toward the main body by a hinge for storing or convenient transport.

However, the conventional two-wheeled handcart has a problem in that it is impossible to stow a folded box or the like, which can store an article, between the loading plate and the main body while the loading plate is folded toward the main body, thereby lowering ease of use.

In addition, a four-wheeled handcart in which wheel units are automatically folded has one more problem in addition to the problem of the two-wheeled handcart. Unlike a two-wheeled handcart, there is a problem in that a user must carry a heavy folded four-wheeled handcart because there is no wheel for moving the cart in the folded state.

Documents of Related Art
(Patent Document 0001) Korean Utility Model Application Publication No. 20-1999-0033105, published on Aug. 5, 1999; and (Patent Document 0002) Korean Patent No. 10-1787239, published on Oct. 18, 2017.

BRIEF SUMMARY OF THE INVENTION

Accordingly, the present invention has been made keeping in mind the above problems occurring in the related art, and an objective of the present invention is to provide a folding handcart in which an article storage box is folded and stowed between a loading plate and a main body while the loading plate is folded toward the main body such that ease of use is excellent and the cart can stably bear loads in a state where the loading plate is unfolded in a direction perpendicular to the main body.

In addition, another objective of the present invention is to provide a folding handcart capable of being kept in an upright state and enabling a user to transfer the folding handcart due to wheels of the cart while a loading plate is folded toward a main body.

In order to achieve the above objective, according to one aspect of the present invention, there is provided a folding handcart including: a main body provided with a supporter configured to extend vertically from a lower portion thereof; and a loading plate provided with at least one loading plate wheel unit, connected to the supporter of the main body through a hinge unit, folded while being rotated toward the main body by the hinge unit, and stowing an article or a folding box, wherein, when the loading plate is folded while being rotated toward the main body, a predetermined stowing space is provided between the main body and the loading plate in accordance with an area of the supporter such that the folding box is folded and stowed therein.

A connecting part may be provided on an upper portion of the main body to hold the folding box. When the folding box is held by the connecting part and folded, the folding box may be disposed on an upper surface of the supporter and placed in the stowing space.

The main body may be provided with at least one main body wheel unit.

The loading plate wheel unit may be connected to a first wheel rod that rotates in a direction perpendicular to the hinge unit by rotation of the hinge unit. The loading plate wheel unit may be configured such that the loading plate wheel unit is rotated and folded toward a bottom surface of the loading plate according to rotation of the first wheel rod when the loading plate is folded while rotating toward the main body, and the loading plate wheel unit is rotated and unfolded in the direction perpendicular to the loading plate when the loading plate is unfolded while rotating in the direction perpendicular to the main body.

The first wheel rod may be provided with a vertical protrusion protruding from a portion thereof vertically and rotating the first wheel rod in accordance with the rotation of the hinge unit. The main body may be provided with a guide recess having a shape in which the vertical protrusion is inserted and corresponding to a rotation path of the vertical protrusion such that the loading plate wheel unit is folded toward the bottom surface of the loading plate or unfolded in the vertical direction of the loading plate by rotation of the vertical protrusion.

According to another aspect of the present invention, at least one auxiliary wheel unit may be provided on the loading plate to move the folding handcart when the loading plate is folded toward the main body and the loading plate wheel unit is folded toward the bottom surface of the loading plate.

According to still another aspect of the present invention, the loading plate wheel unit may be provided with a wheel hinge connected to the loading plate and provided with a second wheel rod connecting the wheel hinge and the main body. The loading plate wheel unit maybe configured such that, when the loading plate is rotated and folded toward the main body, the loading plate wheel unit is pulled toward the main body by the second wheel rod such that the loading plate wheel unit is rotated and folded toward the bottom surface of the loading plate, and when the loading plate is rotated and unfolded in the direction perpendicular to the main body, the loading plate wheel unit is pushed by the second wheel rod such that the loading plate wheel unit is rotated and unfolded in the direction perpendicular to the loading plate.

According to one aspect of the present invention, the loading plate may be provided with a fixing bar in which a first end thereof is configured to protrude. The fixing bar may be configured such that, when the loading plate is unfolded in the direction perpendicular to the main body, the first end thereof is inserted into a first insertion recess configured in the main body to hold the loading plate and to prevent the loading plate from being folded toward the main body.

A hinge cover may be provided on the lower portion of the main body, the hinge cover having a second insertion recess in which the first end of the fixing bar is inserted. The hinge cover may be configured such that, when the loading plate is folded toward the main body, the first end of the fixing bar is inserted into the second insertion recess to hold the loading plate and to prevent the loading plate from being unfolded toward the main body.

An upright leg may be provided on the hinge unit. The upright leg may be configured such that the upright leg protrudes according to the rotation of the hinge unit to make the folding handcart upright when the loading plate is folded toward the main body, and the upright leg is pulled up to the lower portion of the main body by the rotation of the hinge unit when the loading plate is unfolded in the direction perpendicular to the main body.

The main body may be provided with a handle whose angle is adjustable with respect to the main body.

According to the present invention, ease of use is excellent because it is possible to stow an article storage box that is in a folded state between a loading plate and a main body in a state where the loading plate is folded toward the main body. In addition, when the loading plate is unfolded in a direction perpendicular to the main body, it is possible to stably load an article or box on the loading plate without being folded toward the main body by loads of the article or box.

Furthermore, the present invention can maintain an upright state while a loading plate is folded toward the main body, and a user can easily transport an article due to the handcart having wheels.

BRIEF DESCRIPTION OF THE SEVERAL VIEWS OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

In the following description, it is to be noted that, when the functions of conventional elements and the detailed description of elements related with the present invention may make the gist of the present invention unclear, a detailed description of those elements will be omitted. In addition, it will be understood that, although the terms "first", "second", etc. may be used herein to describe various elements, these elements should not be limited by these terms. These terms are only used to distinguish one element from another element.

Furthermore, all terms or words used in the description and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Therefore, the description proposed herein is just a preferable example for the purpose of illustrations only, and is not intended to limit the scope of the disclosure, so it should be understood that other equivalents and modifications could be made thereto without departing from the spirit and scope of the disclosure.

Hereinbelow, embodiments of the present invention will be described in detail. However, descriptions of known functions and configurations which have been deemed to obfuscate the gist of the present invention will be omitted below.

Figure 1:
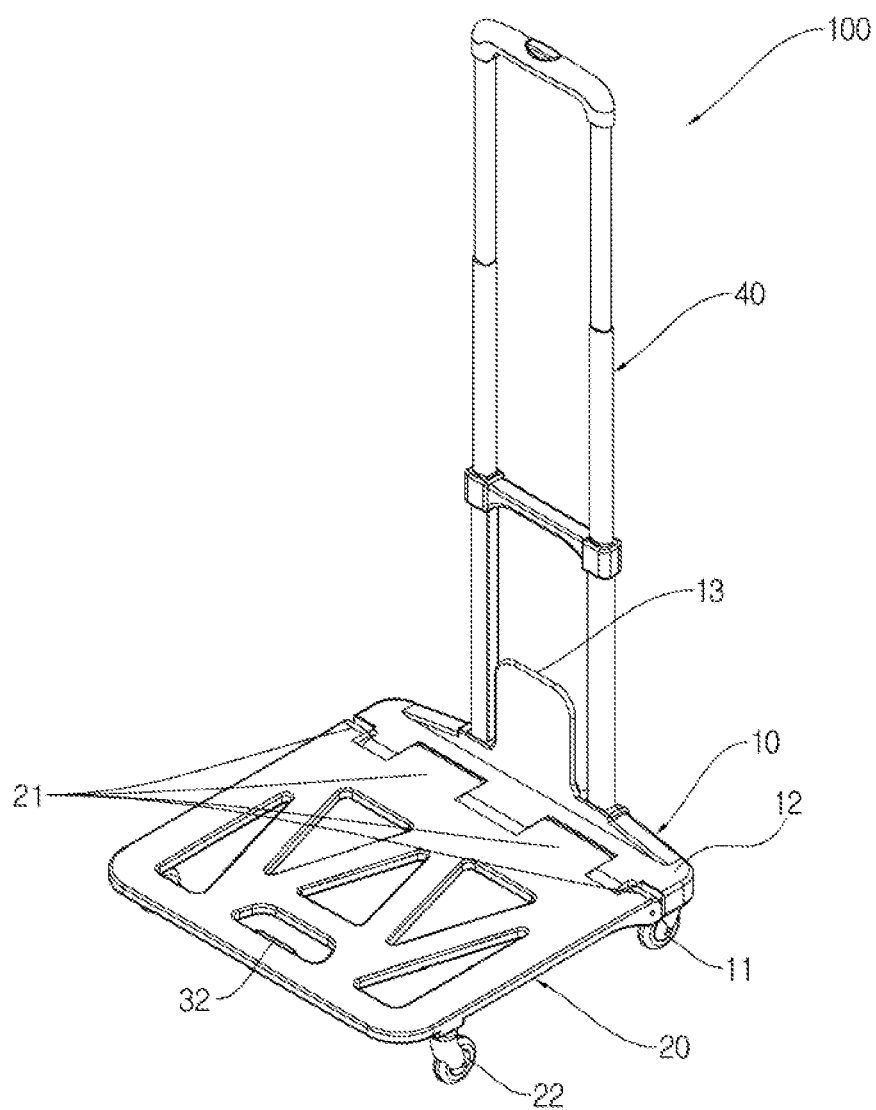
FIGS. 1 and 2 are perspective views each illustrating a folding handcart according to one embodiment of the present invention.
Figure 2:
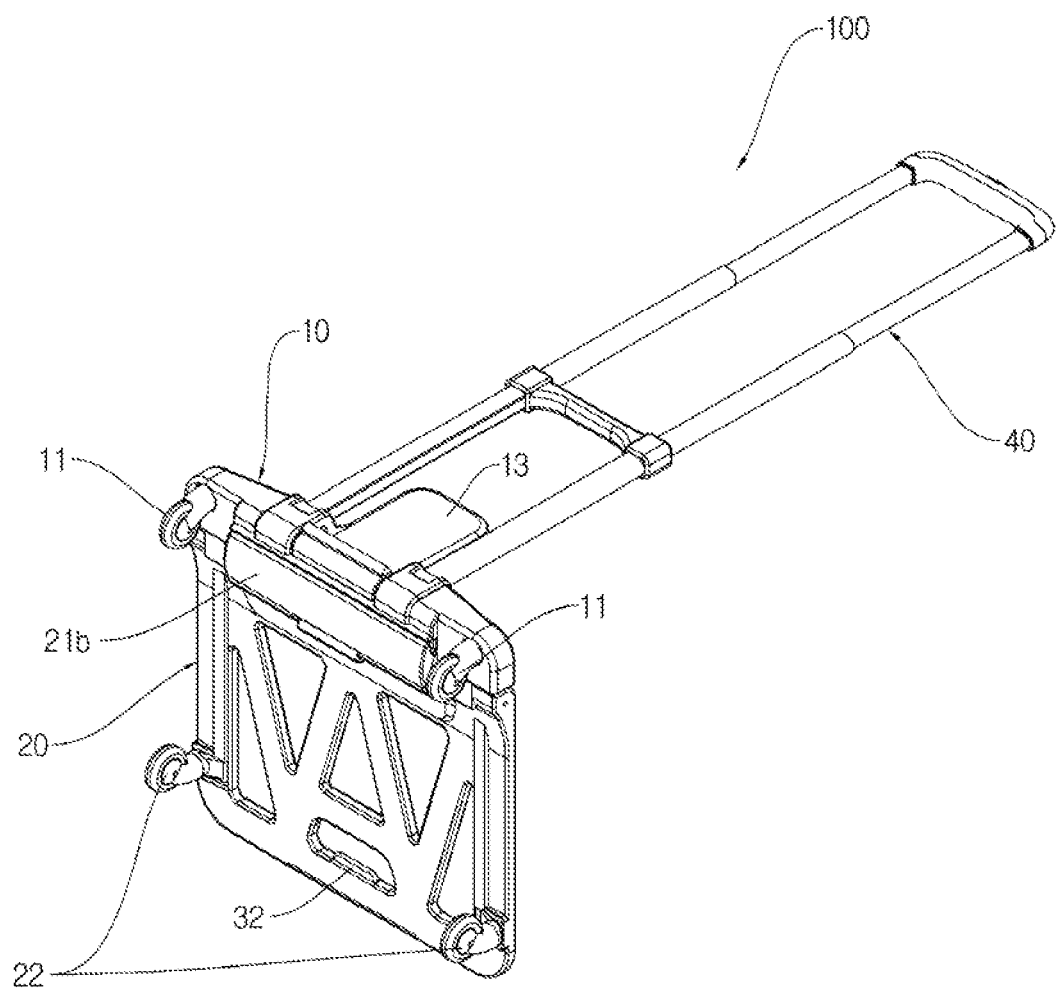
Figure 3:
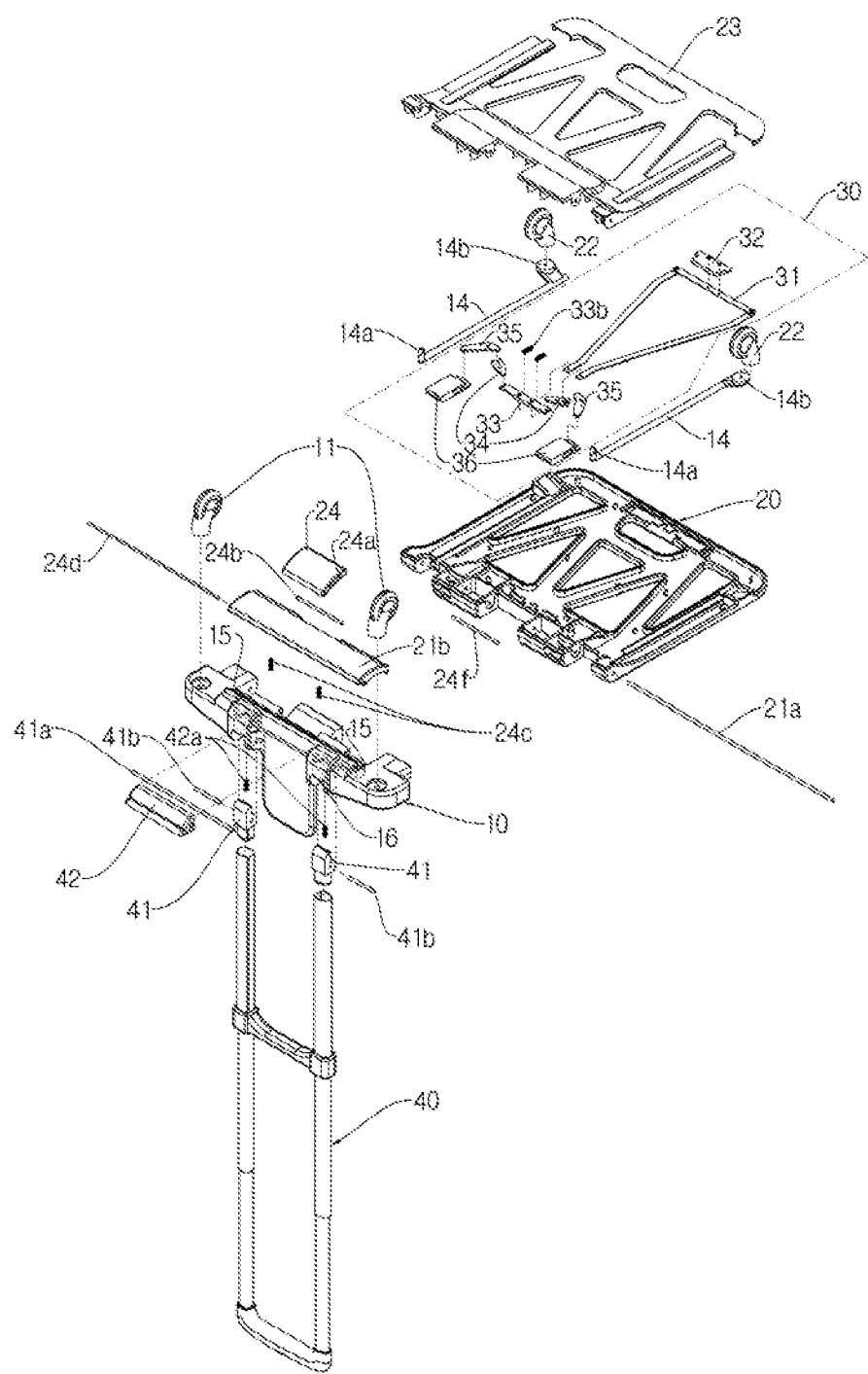
FIG. 3 is an exploded perspective view illustrating a folding handcart according to one embodiment of the present invention.
Figure 4:
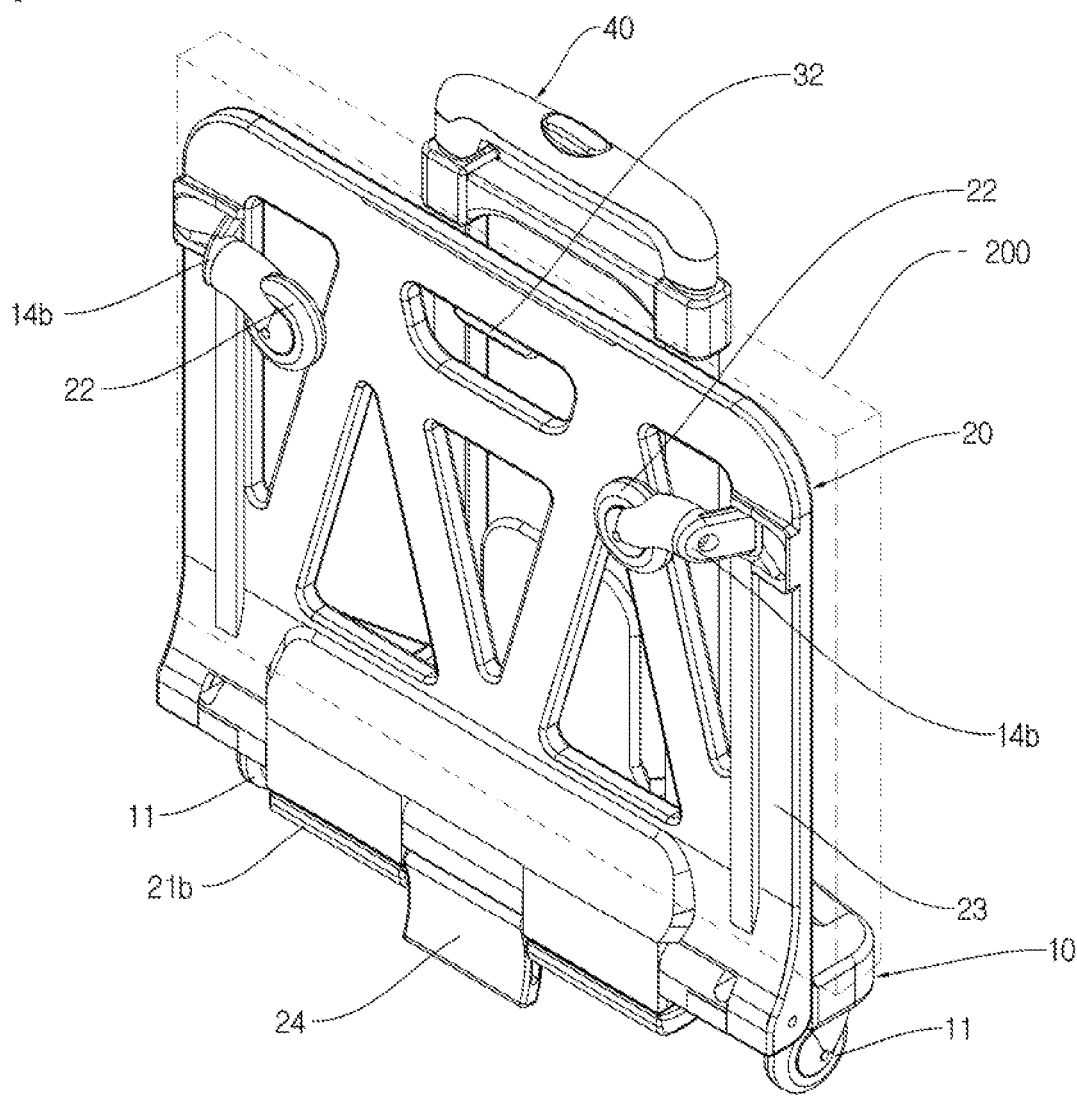
FIGS. 4 and 5 are perspective views illustrating a folding box and a folding handcart according to one embodiment of the present invention in a folded state.
Figure 5:
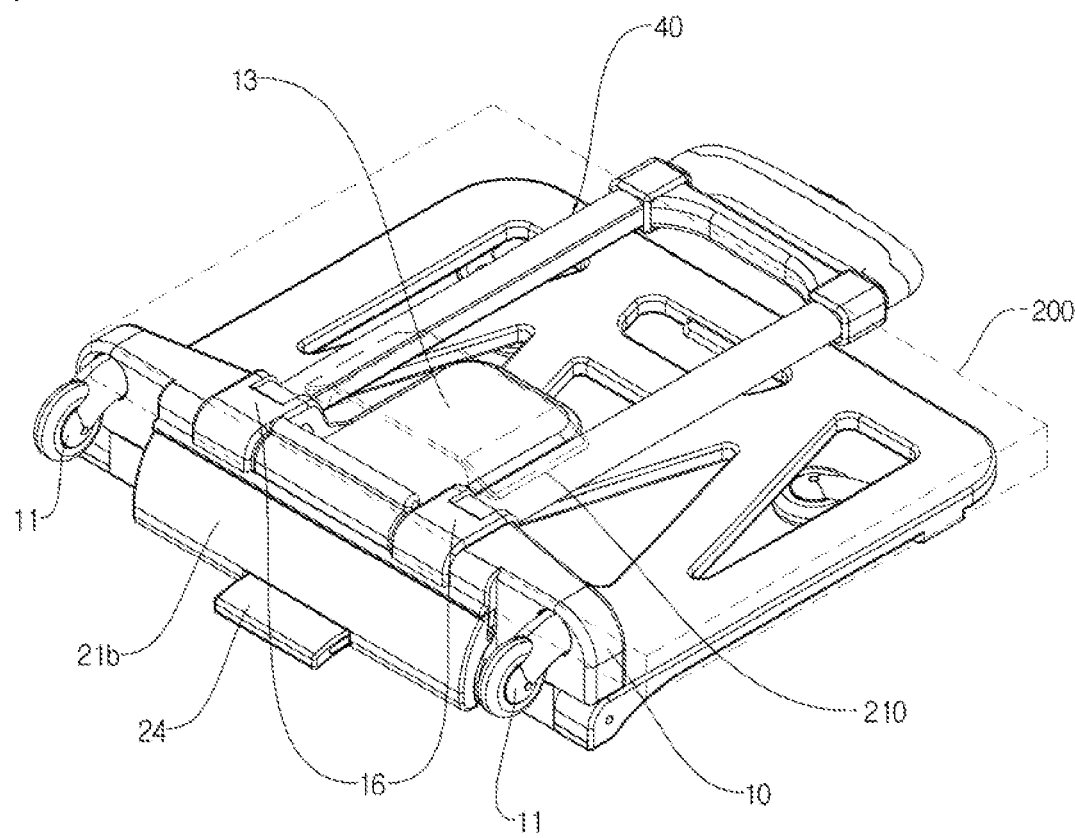
Figure 6:
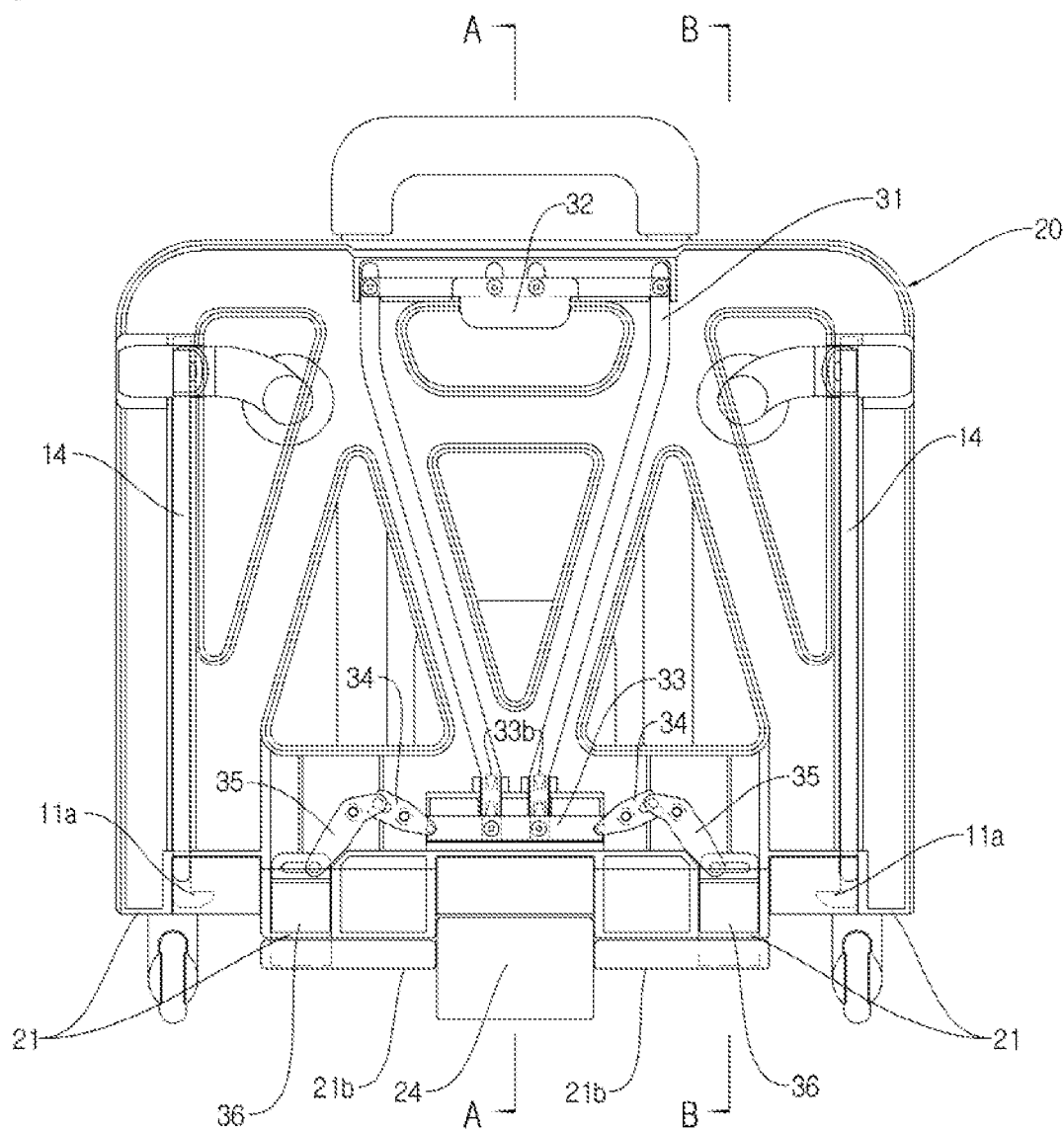
FIG. 6 is an elevational view illustrating an internal structure of a folding handcart when a loading plate of a folding handcart according to one embodiment of the present invention is folded.
Figure 7:
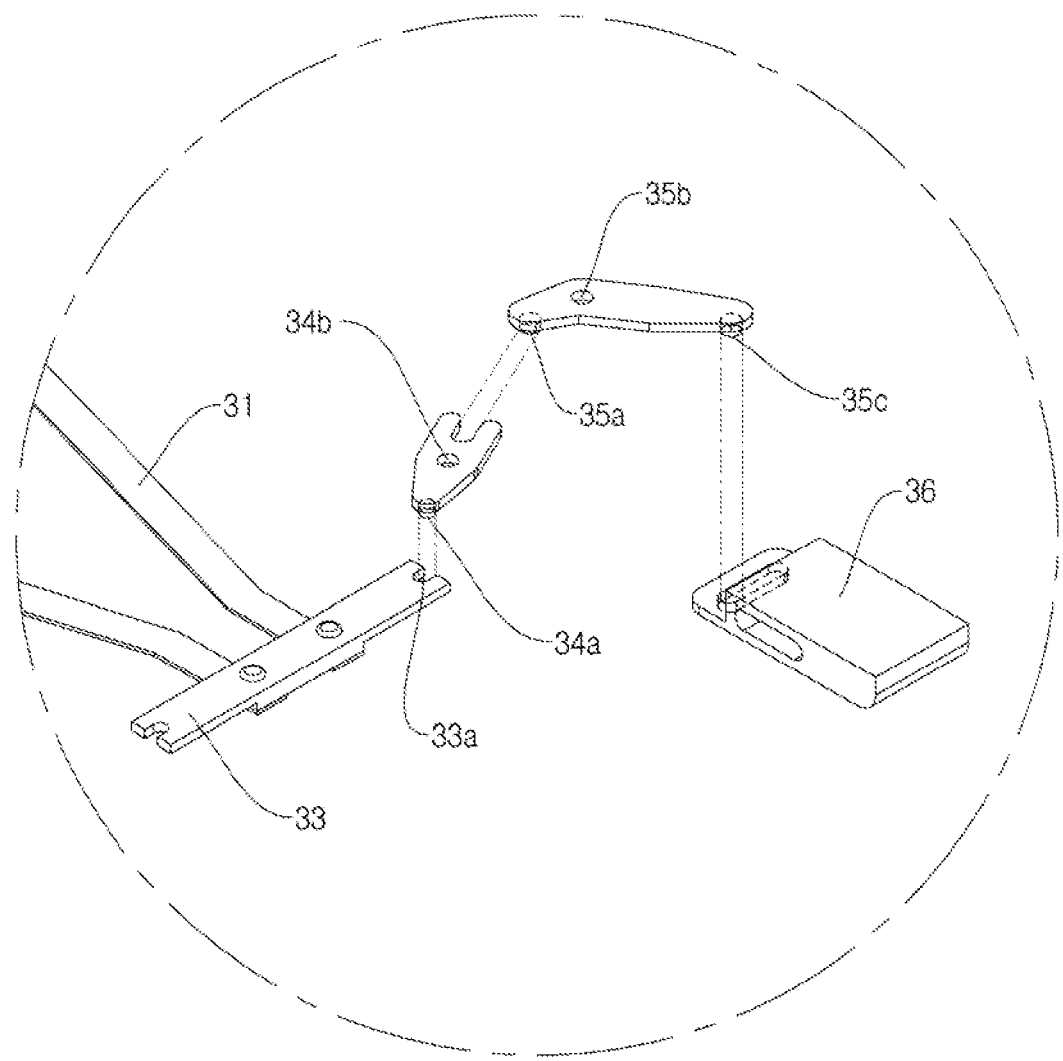
FIG. 7 is a partial perspective view illustrating a configuration of a fixing bar actuating unit in the elevational view of FIG. 6.

FIGS. 1 and 2 are perspective views each illustrating a folding handcart according to one embodiment of the present invention; FIG. 3 is an exploded perspective view illustrating a folding handcart according to one embodiment of the present invention; FIGS. 4 and 5 are perspective views illustrating a folding box and a folding handcart according to one embodiment of the present invention in a folded state; FIG. 6 is an elevational view illustrating an internal structure of a folding handcart when a loading plate of a folding handcart according to one embodiment of the present invention is folded; FIG. 7 is a partial perspective view illustrating a configuration of a fixing bar actuating unit in the elevational view of FIG. 6; and FIG. 8 is an elevational view illustrating an internal structure of a folding handcart when a loading plate of a folding handcart according to one embodiment of the present invention is unfolded.

Figure 8:
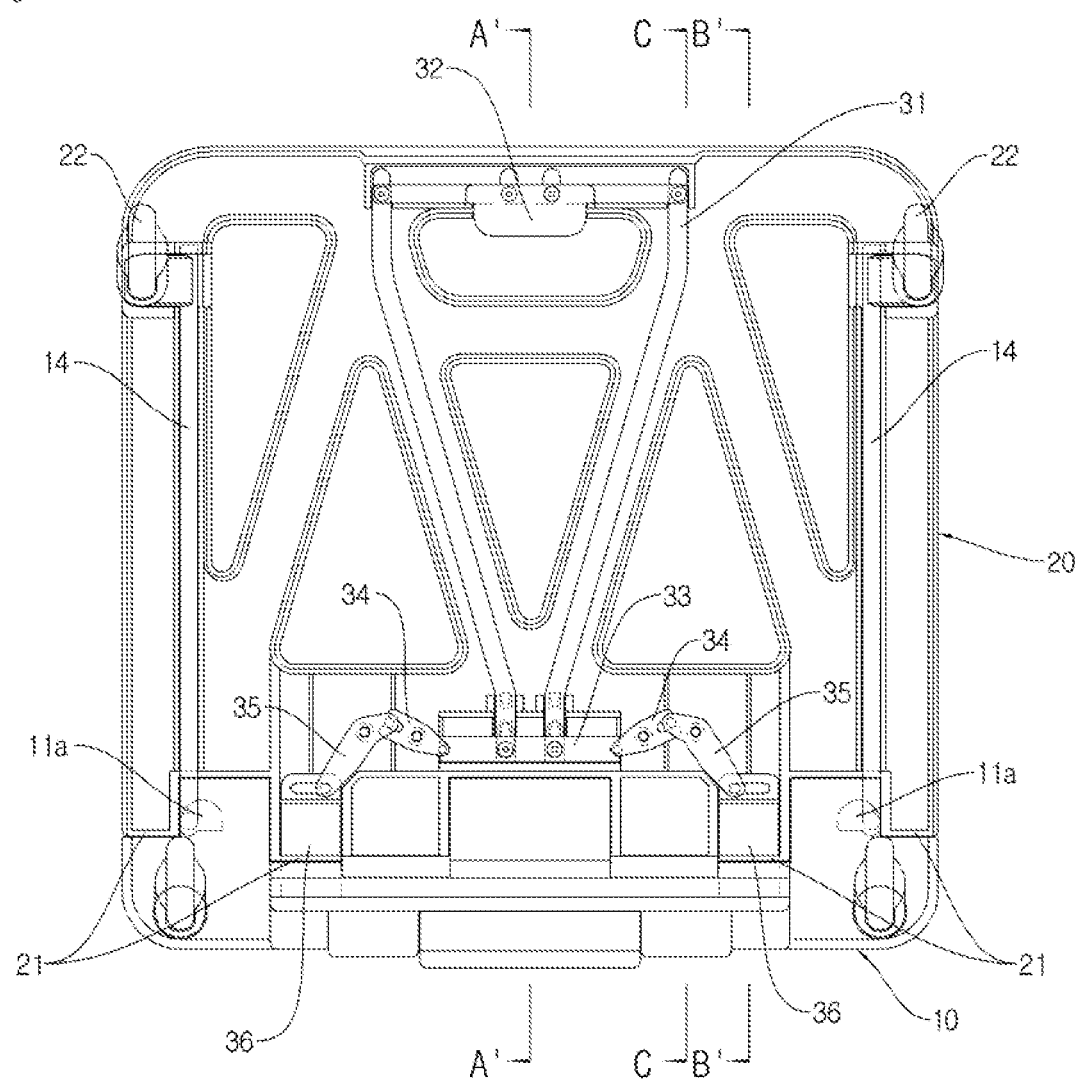
FIG. 8 is an elevational view illustrating an internal structure of a folding handcart when a loading plate of a folding handcart according to one embodiment of the present invention is unfolded.
Figure 9:
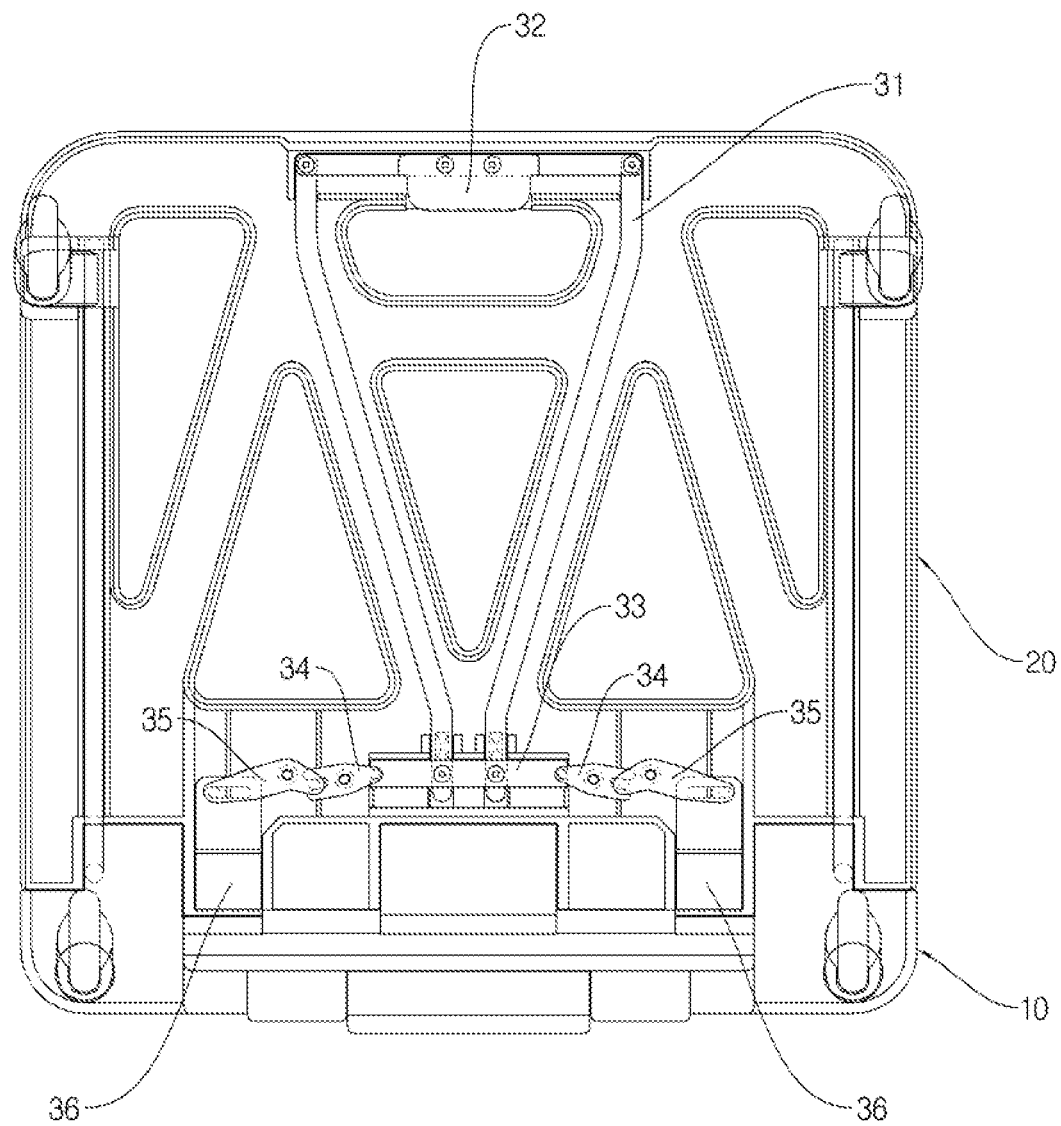
FIG. 9 is an elevational view illustrating a state of the fixing bar actuating unit when a loading plate button is pressed in FIG. 8.
Figure 10:
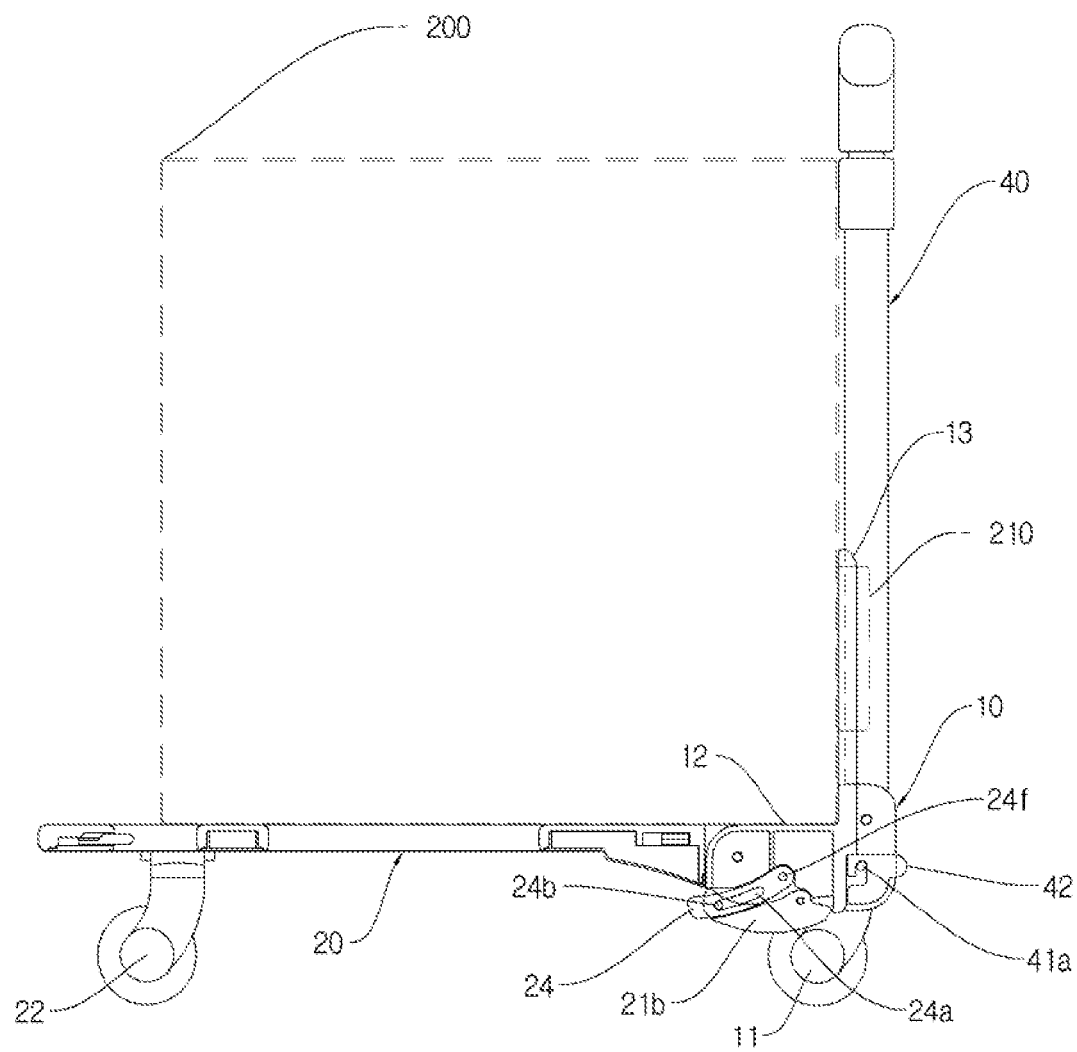
FIG. 10 is a sectional view illustrating that the loading plate of the folding handcart according to the present invention is unfolded, taken along line A'-A' in FIG. 8.
Figure 11:
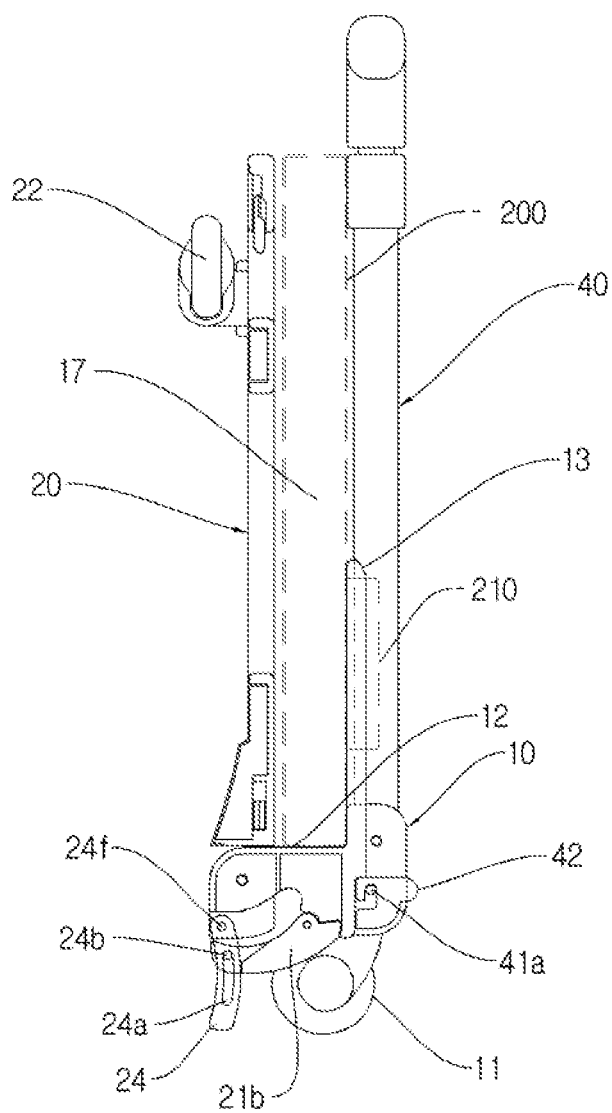
FIG. 11 is a sectional view illustrating that the loading plate of the folding handcart according to the present invention is folded, taken along line A-A in FIG. 6.
Figure 12:
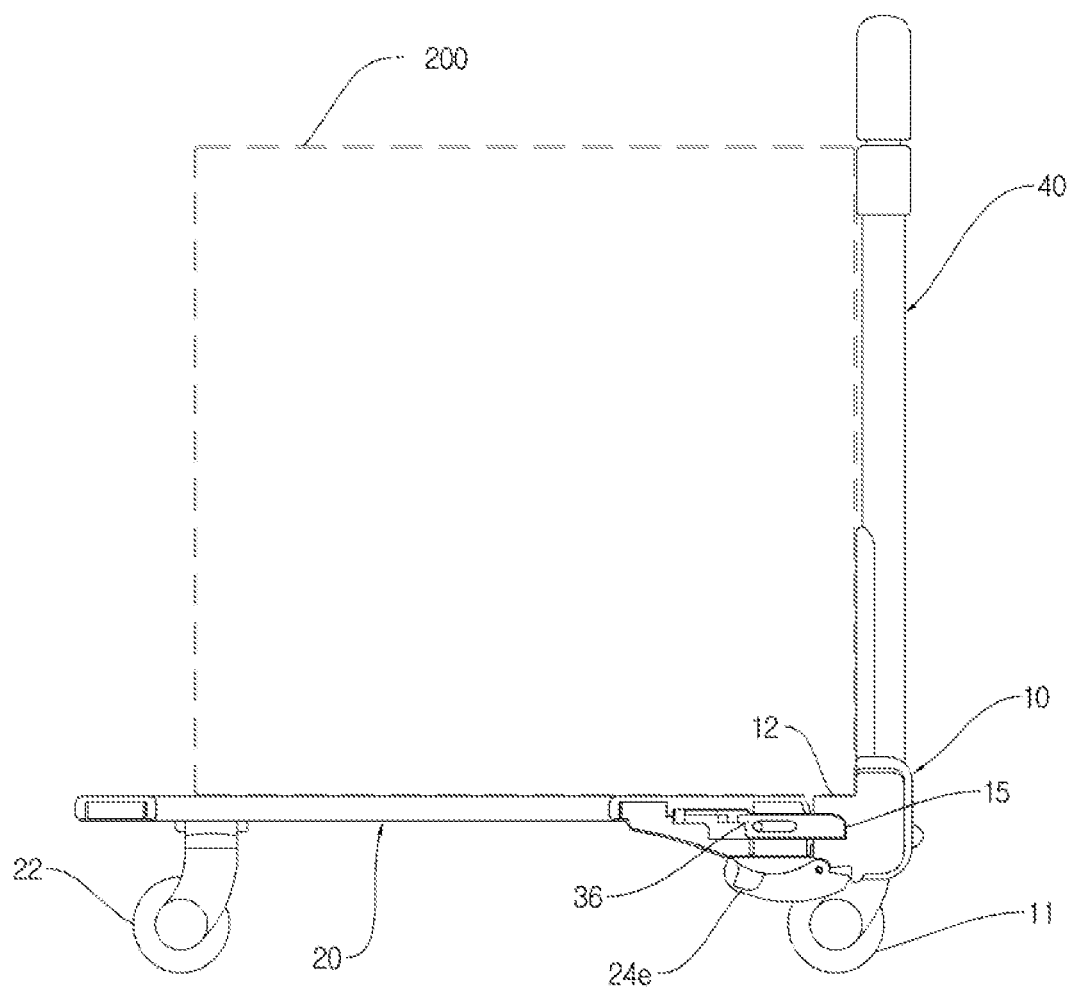
FIG. 12 is a sectional view illustrating that the loading plate of the folding handcart according to the present invention is unfolded, taken along line B'-B' in FIG. 8.
Figure 13:
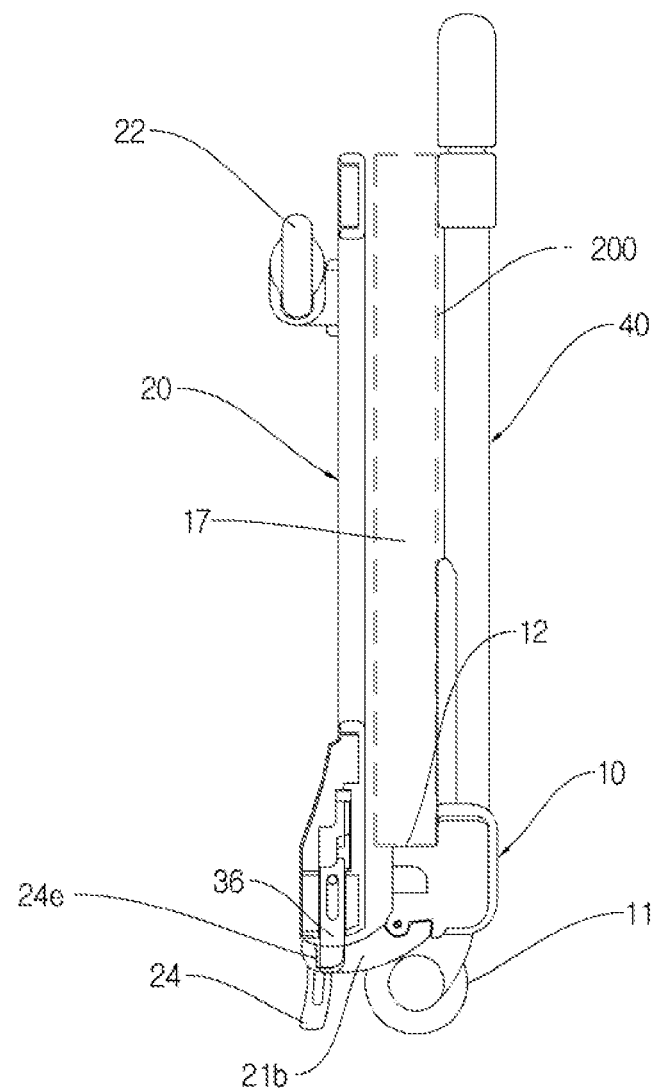
FIG. 13 is a sectional view illustrating that the loading plate of the folding handcart according to the present invention is folded, taken along line B-B in FIG. 6.
Figure 14:
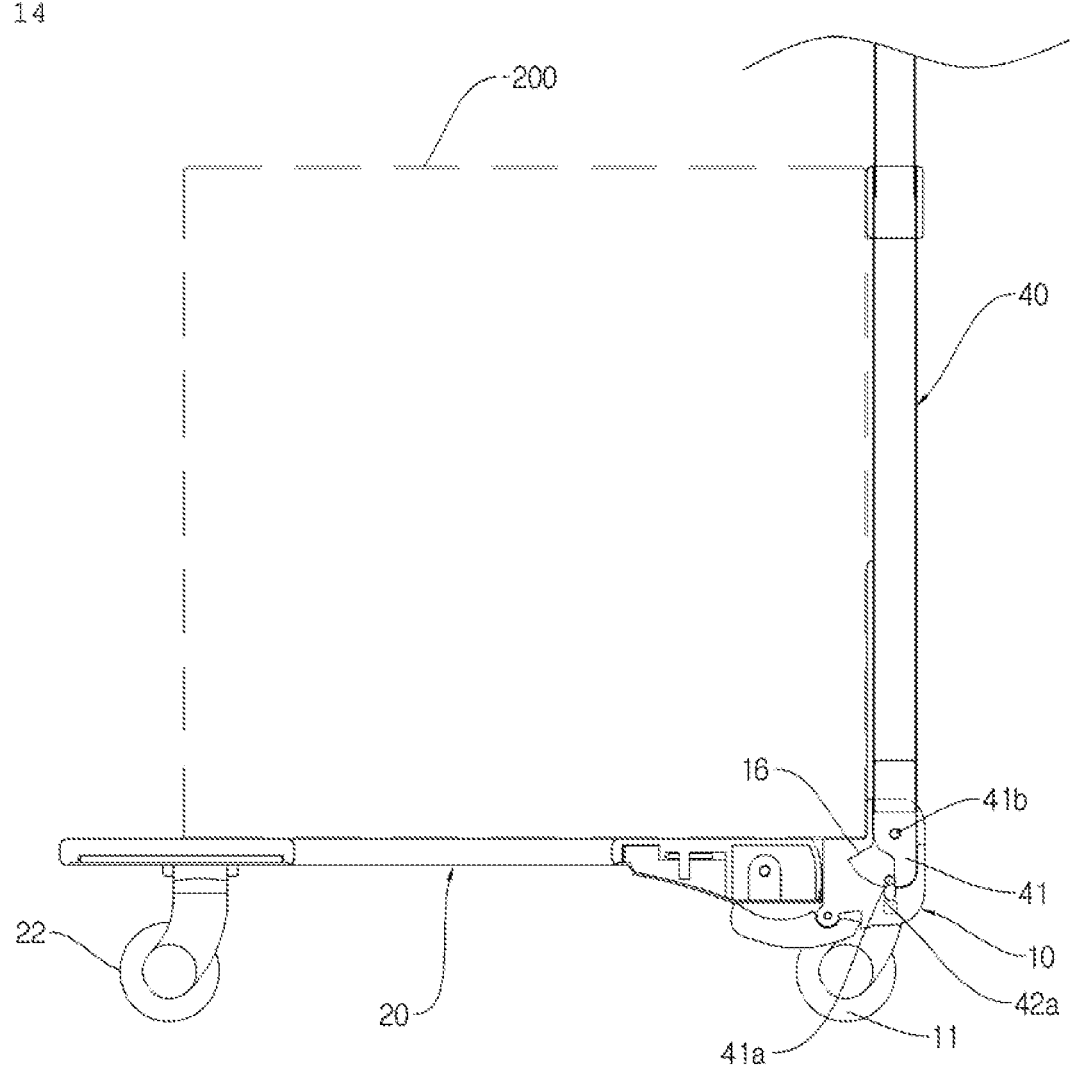
FIG. 14 is a sectional view illustrating that the loading plate of the folding handcart according to the present invention is unfolded, taken along line C-C in FIG. 8.
Figure 15:
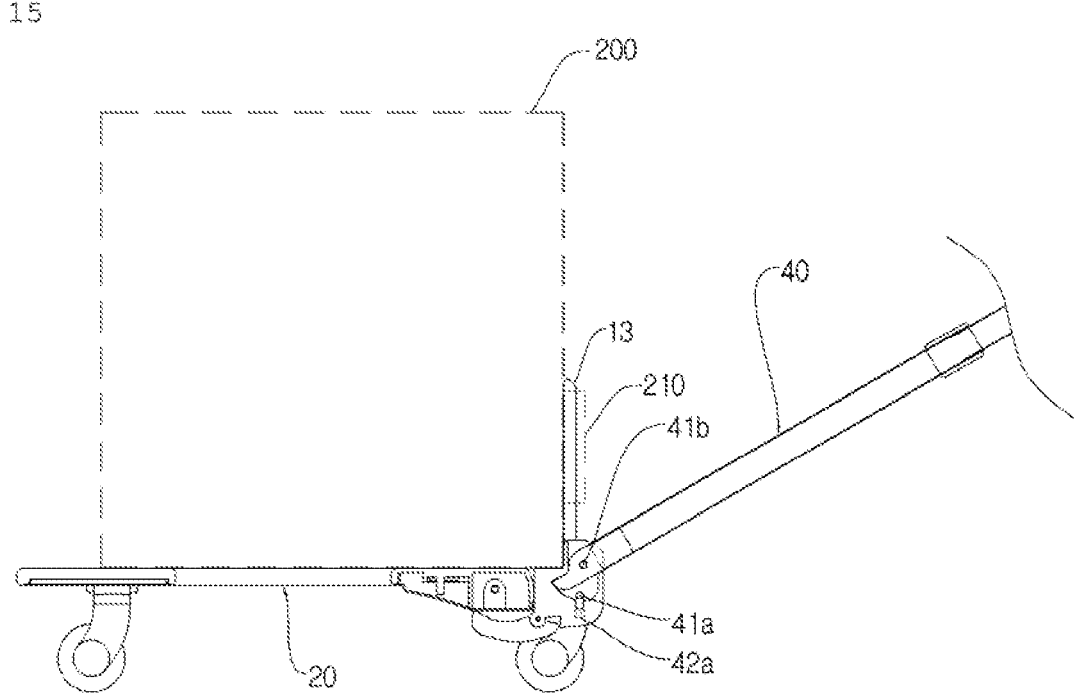
FIG. 15 is a sectional view of FIG. 14 illustrating a state in which a handle is tilted backward.
Figure 16:
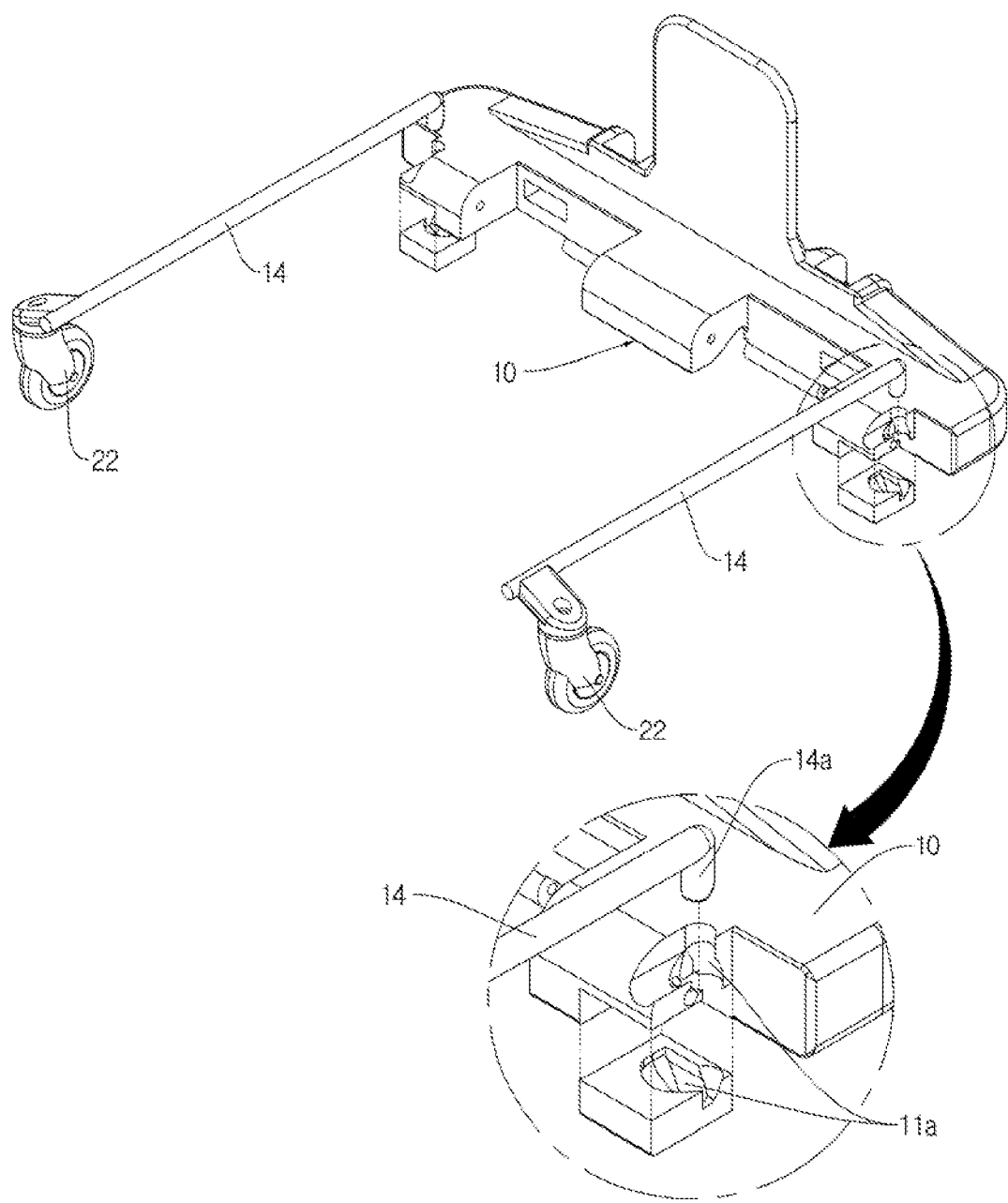
FIGS. 16 and 17 are views illustrating an operating process of a first wheel rod and a loading plate wheel unit of a folding handcart according to one embodiment of the present invention.
Figure 17:
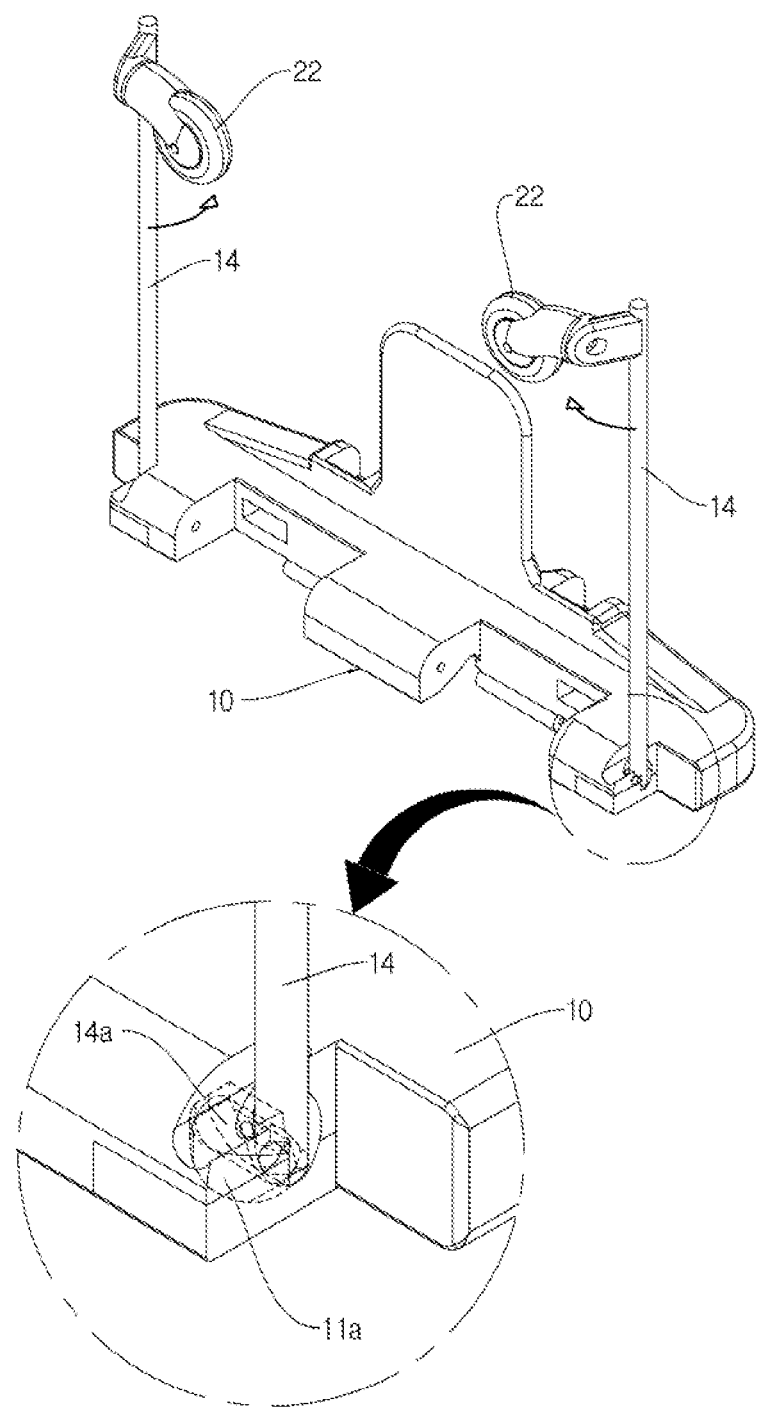

FIG. 9 is an elevational view illustrating a state of the fixing bar actuating unit when a loading plate button is pressed in FIG. 8; FIG. 10 is a sectional view illustrating that the loading plate of the folding handcart according to the present invention is unfolded, taken along line A'-A' in FIG. 8; FIG. 11 is a sectional view illustrating that the loading plate of the folding handcart according to the present invention is folded, taken along line A-A in FIG. 6; FIG. 12 is a sectional view illustrating that the loading plate of the folding handcart according to the present invention is unfolded, taken along line B'-B' in FIG. 8; FIG. 13 is a sectional view illustrating that the loading plate of the folding handcart according to the present invention is folded, taken along line B-B in FIG. 6; FIG. 14 is a sectional view illustrating that the loading plate of the folding handcart according to the present invention is unfolded, taken along line C-C in FIG. 8; FIG. 15 is a sectional view of FIG. 14 illustrating a state in which a handle is tilted backward; and FIGS. 16 and 17 are views illustrating an operating process of a first wheel rod and a loading plate wheel unit of a folding handcart according to one embodiment of the present invention.

Figure 19:
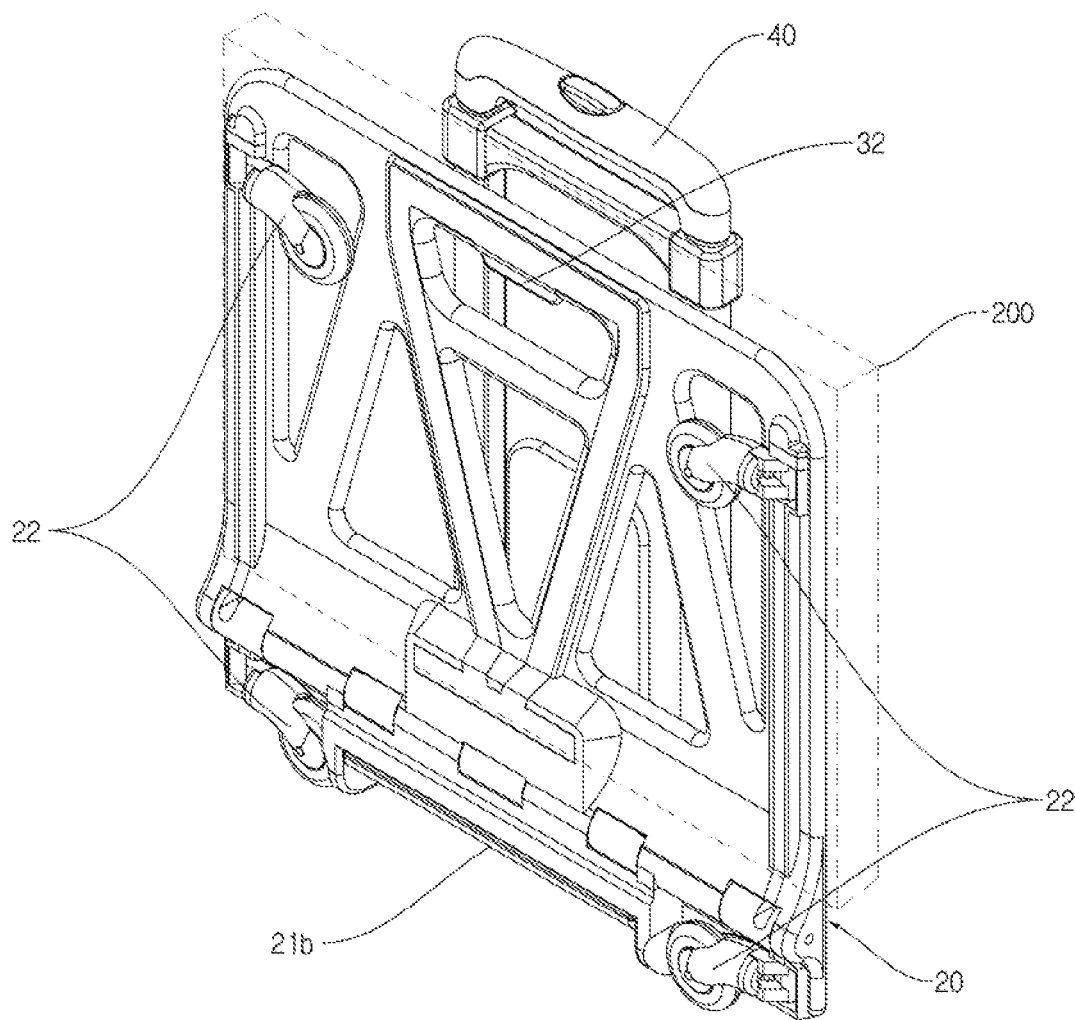
FIGS. 19 and 20 are perspective views illustrating that a folding handcart according to another embodiment of the present invention and a folding box are folded.
Figure 20:
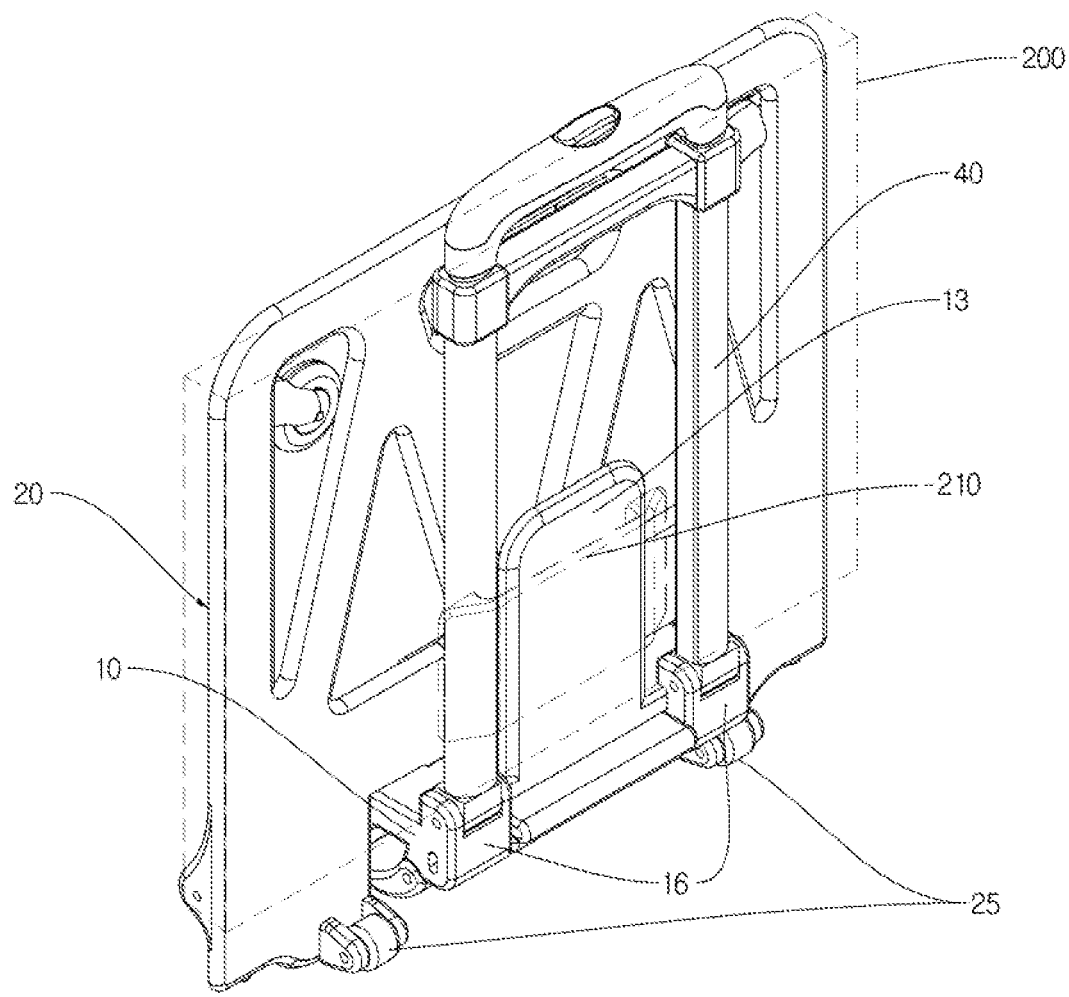
Figure 21:
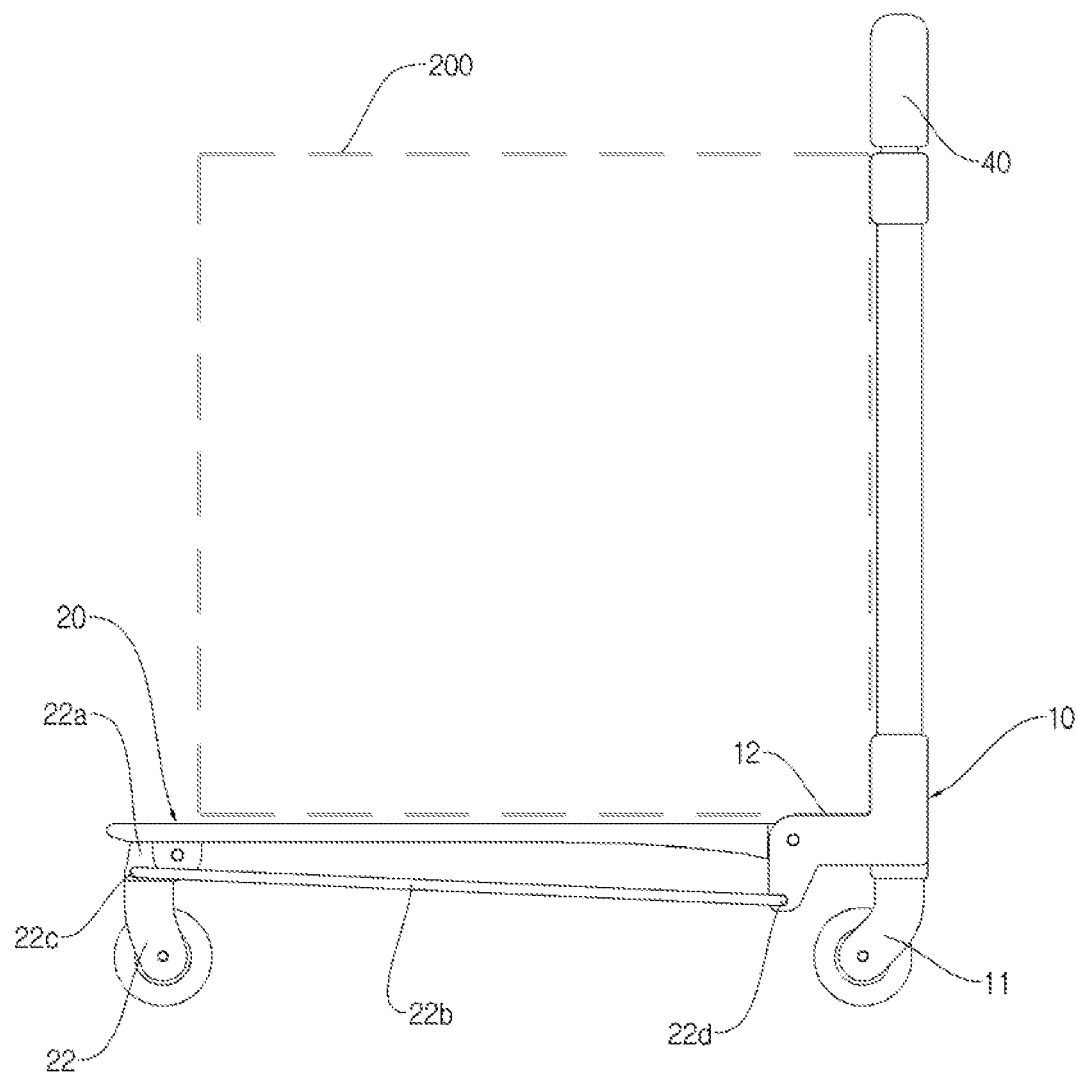
FIG. 21 is an elevational view illustrating an operation of a folding handcart according to still another embodiment of the present invention in a case where the loading plate is unfolded.
Figure 22:
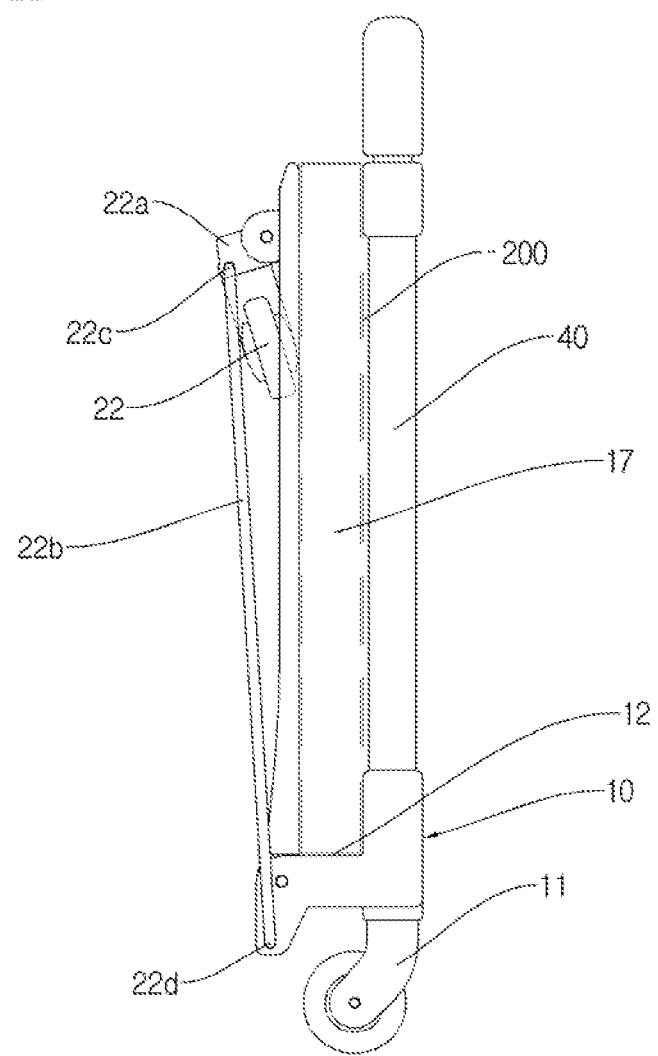
FIG. 22 is an elevational view illustrating an operation of a folding handcart according to still another embodiment of the present invention in a case where the loading plate is folded.
Figure 23:
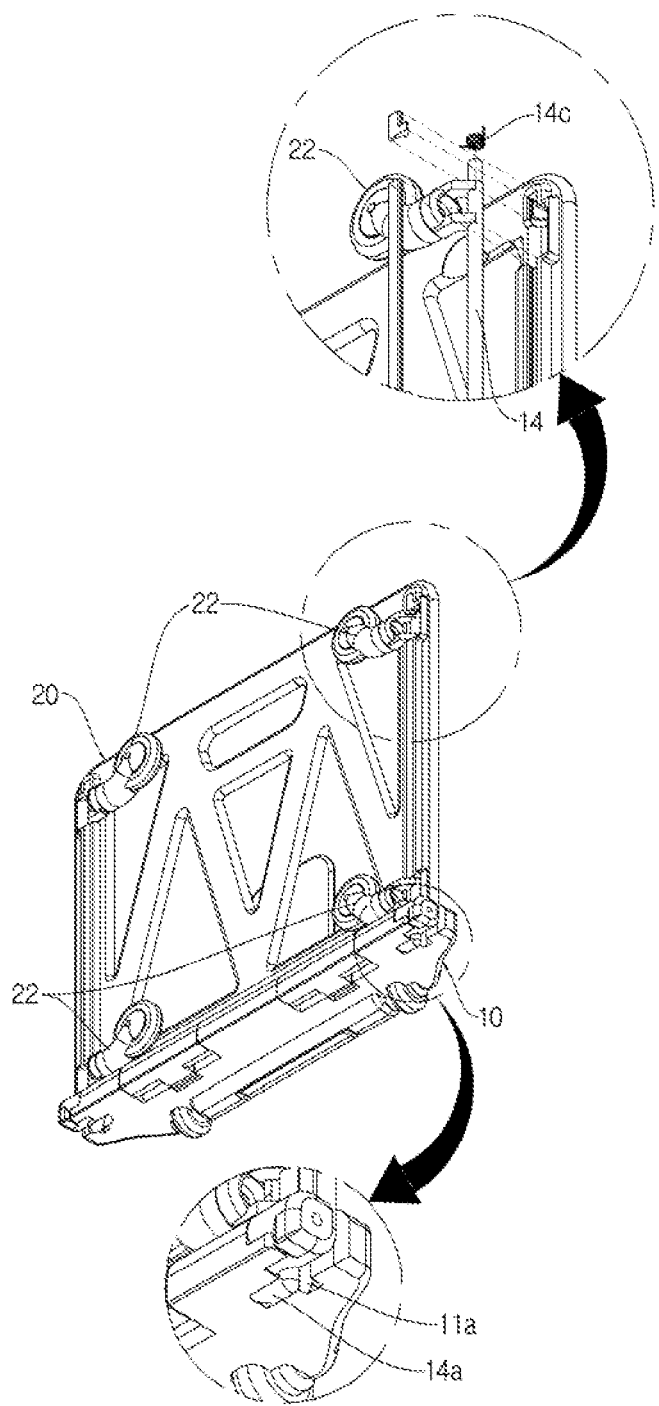
FIG. 23 illustrates an operation of a loading plate of a folding handcart according to a further embodiment of the present invention in a case where the loading plate is folded.
Figure 24:
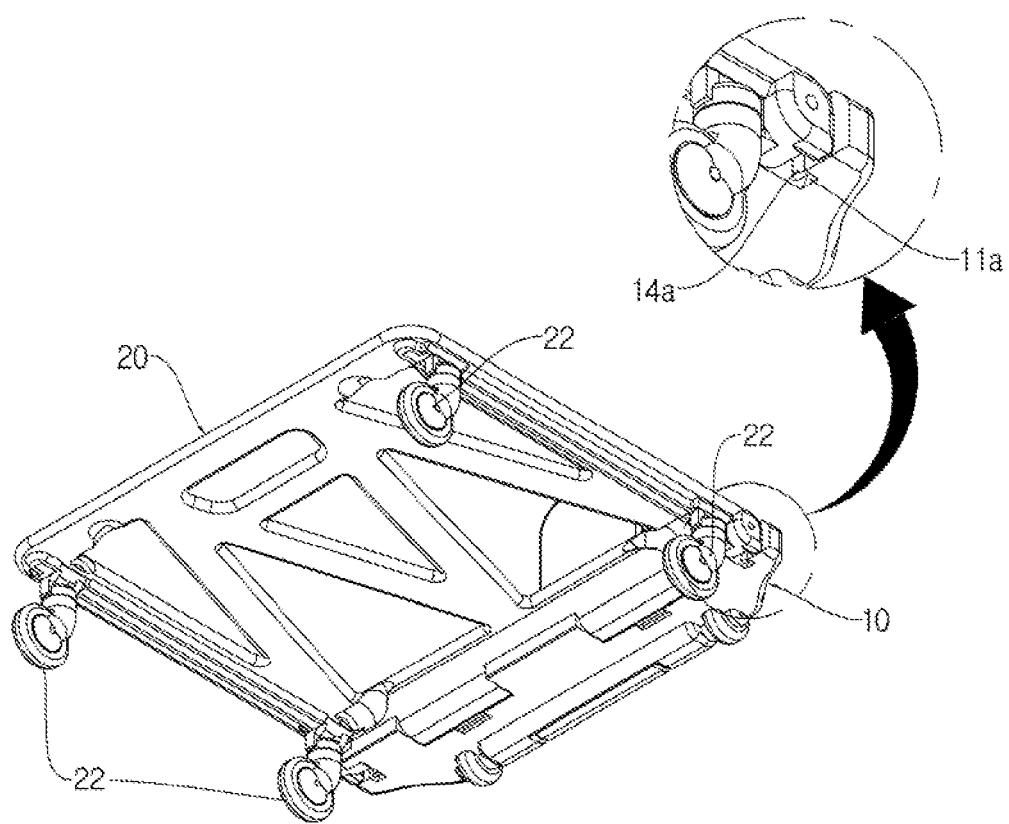
FIG. 24 illustrates an operation of a loading plate of a folding handcart according to a further embodiment of the present invention in a case where the loading plate is unfolded.

FIGS. 19 and 20 are perspective views illustrating that a folding handcart according to another embodiment of the present invention and a folding box are folded; FIG. 21 is an elevational view illustrating an operation of a folding handcart according to still another embodiment of the present invention in a case where the loading plate is unfolded; FIG. 22 is an elevational view illustrating an operation of a folding handcart according to still another embodiment of the present invention in a case where the loading plate is folded; FIG. 23 illustrates an operation of a loading plate of a folding handcart according to a further embodiment of the present invention in a case where the loading plate is folded; and FIG. 24 illustrates an operation of a loading plate of a folding handcart according to a further embodiment of the present invention in a case where the loading plate is unfolded.

A folding handcart 100 according to one embodiment of the present invention includes: a main body 10 provided with a supporter 12 configured to extend vertically from a lower portion thereof; and a loading plate 20 provided with at least one loading plate wheel unit 22, connected to the supporter 12 of the main body 10 through a hinge unit 21, folded while being rotated toward the main body 10 by the hinge unit 21, and stowing an article or a folding box 200, wherein, when the loading plate 20 is folded while being rotated toward the main body 10, a predetermined stowing space 17 is provided between the main body 10 and the loading plate 20 according to an area of the supporter 12 such that the folding box 200 is folded and stowed therein.

The main body 10 may be made of a hard synthetic resin or a metal. The main body 10 may be provided with the supporter 12 configured to extend vertically from the bottom such that the stowing space 17 where the folding box 200 is folded and stored is provided between the main body 10 and the loading plate 20 when the loading plate 20 is folded toward the main body 10.

The loading plate 20 may be made of a hard synthetic resin or a metal as the main body 10 in order to safely carry an article or the folding box 200 on an upper surface thereof. In addition, the loading plate 20 is provided with at least one loading plate wheel unit 22 at the lower portion thereof. Furthermore, the loading plate 20 is provided with the hinge unit 21 such that the loading plate 20 is connected to the supporter 12 of the main body 10 through the hinge unit 21. Therefore, the loading plate 20 is foldable by about 90 degrees toward the main body 10 through the hinge unit 21, and conversely, unfoldable in the perpendicular direction with respect to the main body 10.

The hinge unit 21 may be provided with a hinge rod 21a such that the loading plate 20 is folded while rotating toward the main body 10 or is unfolded in a direction perpendicular to the main body 10.

In addition, according to the present invention, a loading plate support portion (not illustrated) may be provided in a case that multiple loading wheel portions 22 are provided such that when the loading plate 20 is unfolded in the direction perpendicular to the main body 10, the loading plate support portion is in contact with the ground instead of a part of the loading plate wheel units 22 to support the loading plate 20.

In addition, the loading plate 20 may be provided with a loading plate lid 23 covering the loading plate 20 such that it is possible to protect and not to expose components that are provided inside the loading plate 20 and will be described below.

Meanwhile, the folding box 200 may have a space where an article is stored and may be configured to be folded inward.

In addition, as illustrated in FIGS. 4 and 5, in one embodiment of the present invention, the folding handcart 100 is configured such that a connecting part 13 is provided on an upper portion of the main body 10 to hold the folding box 200. The folding box 200 may be disposed on the upper surface of the supporter 12 and placed in the stowing space 17 when the folding box 200 is held by the connecting part 13 and folded. Here, the folding box 200 may be provided with a connection holder 210. That is, it is possible to hold the folding box 200 on the folding handcart 100 of the present invention through the engagement of the connecting part 13 and the connection holder 210 provided on the folding box 200. Accordingly, the folding box 200 folded in the stowing space 17 between the main body 10 and the loading plate 20 is stably disposed when the loading plate 20 is folded toward the main body 10.

In the folding handcart 100 according to one embodiment of the present invention, the main body 10 is provided with at least one main body wheel unit 11. The main body wheel unit 11 and the loading plate wheel unit 22 are brought into contact with the ground when the loading plate 20 is unfolded in the direction perpendicular to the main body 10 such that it is possible to move the folding handcart 100 on which an article is loaded. Conversely, only the main body wheel unit 11 is brought into contact with the ground when the loading plate 20 is folded toward the main body 10 such that it is possible to easily move the folding handcart 100.

In the folding handcart according to one embodiment of the present invention, the loading plate wheel unit 22 is connected to a first wheel rod 14 rotated in a vertical direction of the hinge unit 21 by rotation of the hinge unit 21. The loading plate wheel unit 22 is configured such that the loading plate wheel unit 22 is rotated and folded toward the bottom surface of the loading plate 20 according to the rotation of the first wheel rod 14 when the loading plate 20 is folded while rotating toward the main body 10, or the loading plate wheel unit 22 is rotated and unfolded in the direction perpendicular to the loading plate 20 when the loading plate 20 is unfolded while rotating in the direction perpendicular to the main body 10. Accordingly, when the loading plate 20 is unfolded in the direction perpendicular to the main body 10, the folding handcart 100 with an article or the folding box 200 loaded on the loading plate 20 can be stably moved by using the loading plate wheel unit 22.

Here, according to the present invention, a manner in which the first wheel rod 14 rotates according to the rotation of the hinge unit 21 may be configured through a bevel gear structure. That is, at a portion where the main body 10 and the first wheel rod 14 are in contact with each other, teeth that are engaged with each other may be configured thereon. Accordingly, the first wheel rod 14 is rotated together with the hinge unit 21 in the vertical direction by the rotation of the hinge unit 21.

In addition, according to the present invention, a loading plate support portion (not illustrated) may be provided such that, when the loading plate 20 is unfolded in the direction perpendicular to the main body 10, the loading plate support portion is in contact with the ground instead of the loading plate wheel unit 22 to support the loading plate 20. Accordingly, the folding handcart 100 may be provided into a two-wheeled handcart because the folding handcart 100 of the present invention is moved only through the main body wheel 11 in this case.

Referring to FIGS. 16 and 17, in the folding handcart according to one embodiment of the present invention, the first wheel rod 14 may be provided with a vertical protrusion 14a protruding from a portion thereof vertically and rotating the first wheel rod 14 in accordance with the rotation of the hinge unit 21. In addition, the main body 10 may be provided with a guide recess 11a having a shape in which the vertical protrusion 14a is inserted and corresponding to a rotation path of the vertical protrusion 14a such that the loading plate wheel unit 22 is folded toward the bottom surface of the loading plate 20 or unfolded in the vertical direction of the loading plate 20 by the rotation of the vertical protrusion 14a.

That is, when the hinge unit 21 rotates, the guide recess 11a pushes the vertical protrusion 14a to rotate such that the first wheel rod 14 connected thereto is rotated thereby.

Here, the loading plate wheel unit 22 may be mounted on a wheel mounting portion 14b provided on another portion of the first wheel rod 14. Accordingly, as the vertical protrusion 14a rotates inside the guide recess 11a, the loading plate wheel unit 22 is rotated and folded toward the bottom surface of the loading plate 20 or rotated and unfolded in the direction perpendicular to the loading plate 20.

Referring to FIGS. 23 and 24, in the folding handcart according to a further embodiment of the present invention, a shape of the guide recess 11 a is configured such that the vertical protrusion 14a is pushed and rotated only when the loading plate 20 is unfolded in the direction perpendicular to the main body 10, and conversely, the vertical protrusion 14a is not pushed when the loading plate 20 is folded toward the main body 10. In this case, the first wheel rod 14 may be provided with a first wheel rod spring 14c. Accordingly, the first wheel rod 14 is rotated by elastic force of the first wheel rod spring 14c such that the loading plate wheel unit 22 is folded toward the bottom surface of the loading plate 20.

Figure 18:
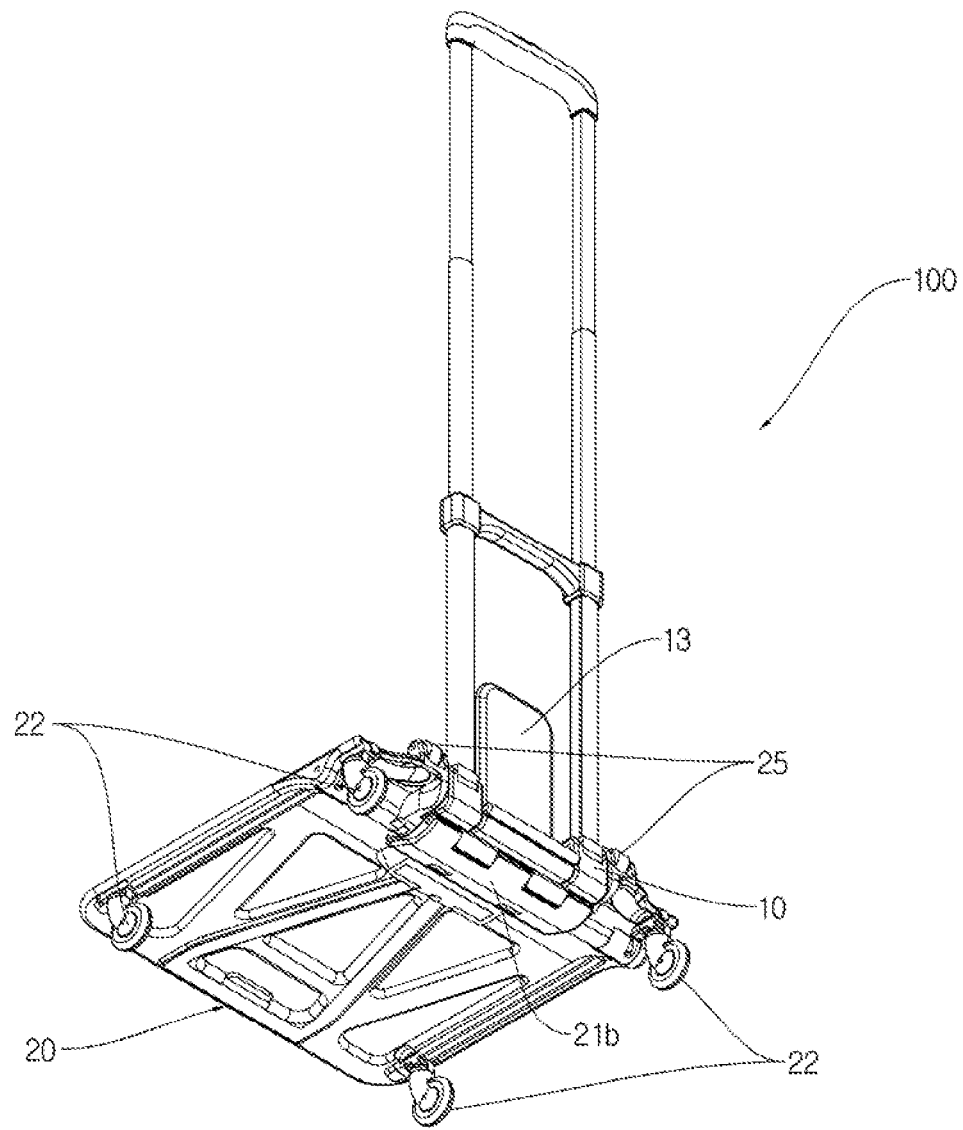
FIG. 18 is a perspective view illustrating a folding handcart according to another embodiment of the present invention.

Referring to FIGS. 18 to 20, in the folding handcart according to another embodiment of the present invention, at least one auxiliary wheel unit 25 may be provided on the loading plate 20 to move the folding handcart 100 when the loading plate 20 is folded toward the main body 10 and then the loading plate wheel unit 22 is folded toward the bottom surface of the loading plate 20.

Accordingly, it is possible to easily move the folding handcart 100 using the auxiliary wheel unit 25 provided on the loading plate 20 when the loading plate 20 is folded toward the main body 10, thereby improving ease of use.

In the folding handcart according to one embodiment of the present invention, the loading plate 20 is provided with a fixing bar 36 in which a first end thereof is configured to protrude. The fixing bar 36 is configured such that, when the loading plate 20 is unfolded in the direction perpendicular to the main body 10, the first end thereof is inserted into a first insertion recess 15 formed in the main body 10 to hold the loading plate 20 and to prevent the loading plate 20 from being folded toward the main body 10.

Here, a fixing bar actuating unit 30 may be provided inside the loading plate 20. The fixing bar actuating unit 30 may include a pulling plate 31, a loading plate button 32, a pulling bar 33, a pulling bar spring 33b, a first rotating body 34, a second rotating body 35, and the fixing bar 36. The above components may be configured to be interlocked with each other such that pressing force is transferred to the fixing bar 36 when the loading plate button 32 is pressed.

In addition, the first insertion recess 15 is configured in the main body 10 such that the fixing bar 36 is inserted in the first insertion recess 15 when the loading plate 20 is unfolded in the direction perpendicular to the main body 10.

In the folding handcart according to one embodiment of the present invention, a hinge cover 21b is provided on the lower portion of the main body 10, the hinge cover 21b having a second insertion recess 24e in which the first end of the fixing bar 36 is inserted. The hinge cover 21b is configured such that the first end of the fixing bar 36 is inserted into the second insertion recess 24e to hold the loading plate 20 and to prevent the loading plate 20 from being unfolded in the direction perpendicular to the main body 10 when the loading plate 20 is folded toward the main body 10.

Here, the hinge cover 21b is connected to the main body 10 by a hinge cover hinge rod 24d, and a hinge cover spring 24c is provided between a side of the hinge cover 21b and the lower portion of the main body 10. Accordingly, the hinge cover 21b is configured such that the hinge cover 21b is pushed up by the hinge cover spring 24c during moving when the loading plate 20 is unfolded in the direction perpendicular to the main body 10.

In the folding handcart according to one embodiment of the present invention, an upright leg 24 is provided on the hinge unit 21. The upright leg 24 is configured such that the upright leg 24 protrudes by the rotation of the hinge unit 21 to make the folding handcart 100 upright when the loading plate 20 is folded toward the main body 10, and the upright leg 24 is pulled up to the lower portion of the main body 10 by the rotation of the hinge unit 21 when the loading plate 20 is unfolded in the direction perpendicular to the main body 10.

Here, the upright leg 24 may be connected to the hinge unit 21 through a leg hinge rod 24f and may be connected to the hinge cover 21b through a leg guide rod 24b.

In the folding handcart according to one embodiment of the present invention, the main body 10 may be provided with a handle 40 whose angle is adjustable with respect to the main body 10.

In addition, in order to improve the convenience of use, the handle 40 maybe configured into a length adjustable form according to the present invention.

Hereinafter, in a case where the loading plate 20 is folded toward the main body 10 according to one embodiment of the present invention, an operation of unfolding the loading plate 20 in the direction perpendicular to the main body 10 will be described in detail.

Referring to FIGS. 6, 11, and 13, in the case where the loading plate 20 is folded toward the main body 10, the folding box 200 is held on the connecting part 13 by the connection holder 210 between the loading plate 20 and the main body 10, and the folding handcart 100 can be erected or be transported while tilted back by the main body wheel unit 11 and the upright leg 24. In addition, the loading plate wheel unit 22 is folded on the bottom surface of the loading plate 20, and the handle 40 is erected in a direction perpendicular to the ground.

Here, the upright leg 24 is connected to the hinge unit 21 through the leg hinge rod 24f and is connected to the hinge cover 21b by the leg guide rod 24b which is connected therewith by passing through a leg hole 24a such that the upright leg 24 is erected in a direction perpendicular to the ground. In addition, the fixing bar 36 is inserted into the second insertion recess 24e such that the loading plate 20 is held thereby.

Referring to FIGS. 6 to 9, when pushing the loading plate button 32, the pulling plate 31 and the pulling bar 33 are raised such that a hooking dent 33a configured at opposite ends of the pulling bar 33 raises a first projection 34a configured on the first rotating body 34. As the first rotating body 34 rotates about a first central part 34b and lowers a second protrusion 35a configured in the second rotating body 35, the second rotating body 35 rotates about a second central part 35b and a third protrusion 35c pulls up the fixing bar 36 such that the fixing bar 36 is pulled out of the second insertion recess 24e whereby the loading plate 20 can be rotated. Here, when the loading plate 20 is unfolded, force that the vertical projection 14a contacts the inner wall of the guide recess 11a rotates the first wheel rod 14 in a direction perpendicular to the rotational direction of the hinge rod 21a such that the loading plate wheel unit 22 vertically connected to the first wheel rod 14 can be unfolded toward the ground.

In the case where the loading plate 20 is entirely unfolded, the fixing bar 36 is inserted into the first insertion recess 15 by the pulling bar spring 33b as illustrated in FIG. 12. As a result, the hinge unit 21 can be held without being hung down by the load of the article or the folding box 200 loaded on the loading plate 20. Therefore, the article or the folding box 200 can be easily loaded on the loading plate 20 unfolded in the direction perpendicular to the main body 10, and the load can be stably sustained by the unfolded main body wheel unit 11 and the loading plate wheel unit 22.

The folding handcart 100 according to one embodiment of the present invention can be kept the upright state on the ground by the upright leg 24 while the loading plate 20 is folded toward the main body 10.

In addition, when rotating the loading plate 20 around the hinge rod 21a to unfold the loading plate 20, the upright leg 24 connected to the leg hinge rod 24f may be inserted into the lower end of the main body 10 in accordance with the rotation of the hinge unit 21. Here, the upright leg 24 may be supported and raised up by the leg guide rod 24b passing through the leg hole 24a.

Referring to FIGS. 18 to 20, the folding handcart 100 according to another embodiment of the present invention may be configured such that the article loaded on the folding handcart 100 is moved only by the loading plate wheel unit 22 without being provided with the main body wheel unit 11 when the loading plate 20 is unfolded in the direction perpendicular to the main body 10. Here, the loading plate wheel unit 22 may be provided on opposite sides of the first wheel rod 14. Loading plate wheels 20 are configured to be folded or unfolded together by the vertical protrusion 14a and the guide recess 11 a when the loading plate 20 is folded toward the main body 10 or unfolded in the direction perpendicular to the main body. In this case, the auxiliary wheel unit 25 is provided on the loading plate 20 such that the folding handcart 100 can be easily carried thereby when the loading plate 20 is folded toward the main body 10.

Referring to FIGS. 21 and 22, in the folding handcart according to still another embodiment of the present invention, a wheel hinge 22a may be provided on the loading plate wheel unit 22, the wheel hinge 22a being connected to the loading plate 20. In addition, a second wheel rod 22b connecting the wheel hinge 22a and the main body 10 may be provided. In addition, the loading plate wheel unit 22 may be configured such that, when the loading plate 20 is rotated and folded toward the main body 10, the loading plate wheel unit 22 is pulled toward the main body 10 by the second wheel rod 22b such that the loading plate wheel unit 22 is rotated and folded toward the bottom surface of the loading plate 20, and when the loading plate 20 is rotated and unfolded in the direction perpendicular to the main body 10, the loading plate wheel unit 22 is pushed by the second wheel rod 22b such that the loading plate wheel unit 22 is rotated and unfolded in the direction perpendicular to the loading plate 20. In this case, the second wheel rod 22b may be provided with a first connecting portion 22c on a first end thereof and a second connecting portion 22d on a second end thereof. Therefore, the second wheel rod 22b is connected to the wheel hinge 22a through the first connecting portion 22c and connected to the main body 10 through the second connecting portion 22d.

When the loading plate 20 is folded, the first connecting portion 22c is pulled toward the main body 10 by the second wheel rod 22b connected to the second connecting portion 22d such that the wheel hinge 22a are rotated, and the loading plate wheel unit 22 is folded on the bottom surface of the loading plate 20.

Conversely, when the loading plate 20 is unfolded, the first connecting portion 22c is pushed downwardly of the loading plate 20 by the second wheel rod 22b connected to the second connecting portion 22d such that the wheel hinge 22a is rotated, and the loading plate wheel unit 22 is unfolded in the direction perpendicular to the loading plate 20.

Hereinafter, operating the handle 40 according to one embodiment of the present invention will be described in detail.

Specifically, the handle 40 may include a handle lever 41, a lever support rod 41a, a lever fixing rod 41b, a lever foot button 42, and a foot button spring 42a.

The handle 40 may be connected to the main body 10 and maybe configured to be tilted back against the main body 10 or held upright to the main body 10 according to needs of a user.

Referring to FIGS. 14 and 15, when pressing the lever foot button 42, the foot button spring 42a supporting the lever support rod 41a is pressed down and the lever support rod 41a is lowered. Accordingly, the handle lever 41 can be rotated in a lever mounting portion 16 provided on the main body 10 such that a user can tilt back the handle 40 against the main body 10 to use the cart.

Conversely, when standing the handle 40 upright toward the body, the handle lever 41 presses the lever support rod 41a and the foot button spring 42a such that the handle lever 41 is returned to the original state. Accordingly, the support rod 41a is raised by the elastic force of the foot button spring 42a and thus the handle 40 standing upright in the direction perpendicular to the ground is held.

As described above, an angle of the handle 40 of the folding handcart 100 according to one embodiment of the present invention is easily adjusted with respect to the main body 10 whereby convenience in use is further improved, which means that a user can carry the folding handcart 100 easily.

Although the invention is described with reference to specific items such as specific structural elements, to merely some embodiments, and to drawings, such specific details disclosed herein are merely representative for purposes of helping more comprehensive understanding of the present invention. The present invention, however, is not limited to only the example embodiments set forth herein, and those skilled in the art will appreciate that the present invention can be embodied in many alternate forms. Accordingly, the present invention is intended to cover not only the exemplary embodiments, but also various alternatives, modifications, equivalents and other embodiments that may be included within the spirit and scope of the present invention as defined by the appended claims.

We claim:

1. A folding handcart comprising:
a main body provided with a supporter configured to extend vertically from a lower portion thereof; and
a loading plate provided with at least one loading plate wheel unit, connected to the supporter of the main body through a hinge unit, wherein the at least one loading plate wheel unit is folded while being rotated toward the main body by the hinge unit, and stowing an article of a folding box,
wherein, when the loading plate is folded while being rotated toward the main body, a predetermined stowing space is provided between the main body and the loading plate in accordance with an area of the supporter such that the folding box is folded and stowed therein
wherein, the loading plate wheel unit is connected to a first wheel rod that rotates in a direction perpendicular to the hinge unit by rotation of the hinge, unit, and
wherein the loading plate wheel unit is configured such that the loading plate wheel unit is rotated and folded toward a bottom surface of the loading plate according to rotation of the first wheel rod when the loading plate is folded while rotating toward the main body, and the loading plate wheel unit is rotated and unfolded in the direction perpendicular to the loading plate when the loading plate is unfolded while rotating in the direction perpendicular to the main body.

2. The folding handcart of claim 1, wherein a connecting part is provided on an upper portion of the main body to hold the folding box, and
the folding box is disposed on an upper surface of the supporter and placed in the stowing space when the folding box is held by the connecting part and folded.

3. The folding handcart of claim 1, wherein the, main body is provided with at least one main body wheel unit.

4. The folding handcart of claim 1, wherein at least one auxiliary wheel unit is provided on the loading plate to move the folding handcart when the loading plate is folded toward the main body and the loading plate wheel unit is folded toward the bottom surface of the loading plate.

5. The folding handcart of claim 1, wherein the loading plate is provided with a wheel hinge connected therewith and provided with a second wheel rod connecting the wheel hinge and the main body, and
the loading plate wheel unit is configured such that, when the loading plate is rotated and folded toward the main body, the loading plate wheel unit is pulled toward the main body by the second wheel rod such that the loading plate wheel unit is rotated and folded toward the bottom surface of the loading plate, and when the loading plate is rotated and unfolded in the direction perpendicular to the main body, the loading plate wheel unit is pushed by the second wheel rod such plate.

6. The folding handcart of claim 1, wherein the loading plate is provided with a fixing bar in which a first, end thereof is configured to protrude, and
the fixing bar is configured such that, when the loading plate is unfolded in the direction perpendicular to the main body, the first end thereof is inserted into a first insertion recess configured in the main body to hold the loading plate and to prevent the loading plate from being folded toward the main body.

7. The folding handcart of claim 6, wherein a hinge cover is provided on the lower portion of the main body, the hinge cover having a second insertion recess in which the first end of the fixing bar is inserted, and the hinge cover is configured such that, when the loading plate is folded toward the main body, the first end of the fixing bar is inserted into the second insertion recess to hold the loading plate and to prevent the loading plate from being unfolded toward the main body.

8. The folding handcart of claim 1, wherein an upright leg is provided on the hinge unit, and the upright leg is configured such that the upright leg protrudes according to the rotation of the hinge unit to make the folding handcart upright when the loading plate is folded toward the main body, and the upright leg is pulled up to the lower portion of the main body by the rotation of the hinge unit when the loading plate is unfolded in the direction perpendicular to the main body.

9. The folding handcart of claim 1, wherein the main body is provided with a handle whose angle is adjustable with respect to the main body.

10. A folding handcart comprising:

a main body provided with a supporter configured to extend vertically from a lower portion thereof;

a loading plate provided with at least one loading plate wheel unit, connected to the supporter of the main body through a hinge unit, folded while being rotated toward the main body by the hinge unit, and stowing an article of a folding box;

wherein, when the loading plate is folded while being rotated toward the main body, a predetermined stowing space is provided between the main body and the loading plate in accordance with an area of the supporter such that the folding box is folded and stowed therein;

wherein the loading plate wheel unit is connected to a first wheel rod that rotates in a direction perpendicular to the hinge unit by rotation of the hinge unit;

the loading plate wheel unit is configured such that the loading plate wheel unit is rotated and folded toward a bottom surface of the loading plate according to rotation of the first wheel rod when the loading plate is folded while rotating toward the main body, and the loading plate wheel unit is rotated and unfolded in the direction perpendicular to the loading plate when the loading plate is unfolded while rotating in the direction perpendicular to the main body;

wherein the first wheel rod is provided with a vertical protrusion protruding from a portion thereof vertically and rotating the first wheel rod in accordance with the rotation of the hinge unit, and the main body is provided with a guide recess having a shape in which the vertical protrusion is inserted and corresponding to a rotation path of the vertical protrusion such that the loading plate wheel unit is folded toward the bottom surface of the loading plate or unfolded in the vertical direction of the loading plate by rotation of the vertical protrusion.

* * * * *